(12) United States Patent
Yamada et al.

(10) Patent No.: US 7,750,595 B2
(45) Date of Patent: Jul. 6, 2010

(54) ROTATING MACHINERY CONTROLLER

(75) Inventors: Takahiro Yamada, Nagoya (JP); Hiroya Tsuji, Yokkaichi (JP)

(73) Assignee: Denso Corporation, Kariya (JP)

( * ) Notice: Subject to any disclaimer, the term of this patent is extended or adjusted under 35 U.S.C. 154(b) by 327 days.

(21) Appl. No.: 12/041,220

(22) Filed: Mar. 3, 2008

(65) Prior Publication Data

US 2008/0211450 A1    Sep. 4, 2008

(30) Foreign Application Priority Data

Mar. 2, 2007    (JP)   ............... 2007-053232

(51) Int. Cl.
*H02P 27/04*    (2006.01)
(52) U.S. Cl. ................ 318/801; 318/767; 318/798; 318/799; 318/800; 318/809
(58) Field of Classification Search .......... 318/767, 318/798, 799, 800, 801, 807, 809
See application file for complete search history.

(56) References Cited

U.S. PATENT DOCUMENTS

| | | | |
|---|---|---|---|
| 4,629,959 A * | 12/1986 | Okuyama et al. ......... | 318/727 |
| 5,699,240 A * | 12/1997 | Obayashi ................. | 363/98 |
| 5,942,876 A | 8/1999 | Maekawa | |
| 7,239,102 B2 * | 7/2007 | Fujimura ............ | 318/400.14 |
| 2007/0241703 A1 | 10/2007 | Yamada et al. | |

FOREIGN PATENT DOCUMENTS

| | | |
|---|---|---|
| JP | H10-174453 | 6/1998 |
| JP | 2003-235270 | 8/2003 |
| JP | 2007-288888 | 11/2007 |

* cited by examiner

*Primary Examiner*—Bentsu Ro
*Assistant Examiner*—David S Luo
(74) *Attorney, Agent, or Firm*—Nixon & Vanderhye PC

(57) ABSTRACT

A rotating machinery includes a first control member for performing rectangular wave control by operating the switching devices of an inverter such that an on-state and an off-state occur once for one cycle period in electrical angle of a motor, a second control member for operating the switching devices on the basis of a magnitude relation between upper and lower limits of a predetermined hysteresis region and an actual current flowing through the motor, and a switching member for, when the actual current deviates from the hysteresis region while the rectangular wave control is undertaken, switching the control to an instantaneous current value control performed by the second control member.

22 Claims, 22 Drawing Sheets

ROTATING MACHINERY CONTROLLER

CROSS REFERENCE TO RELATED APPLICATION

The present application is based on and claims priority from Japanese Patent Application No. 2007-53232, filed Mar. 2, 2007, the content of which is incorporated herein by reference.

BACKGROUND OF THE INVENTION

1. Field of the Invention

The present invention relates to a rotating machinery controller for controlling a rotation-related physical quantity of a rotating machinery by operating switching devices of an inverter to supply electric power to the rotating machinery.

2. Description of the Related Art

Rotating machinery controllers of the type concerned are known. One example of such known controllers is disclosed in Japanese Patent Laid-open Publication (JP-A) No. 10-174453. The disclosed rotating machinery controller is arranged to perform instantaneous current value control in which switching devices of an inverter are operated based on a magnitude relation of upper and lower limits of a hysteresis region determined by a command current to a three-phase rotating machinery and an actual current so that the actual current is controlled by a feedback control system with respect to a required current to generate a desired torque.

Another controller is also known, which in a high output torque range or a high rotational speed range of the rotating machinery, performs rectangular wave control to operate the switching devices of an inverter in such a manner that an On-state and an Off-state each occur one time per one period of electrical angle of the rotating machinery. According to the rectangular wave control, it is possible to suppress power loss in the high power and high speed ranges and also to improve the voltage utilization factor which is defined as the ratio of the root-mean-square phase-to-phase voltage to the input voltage of the inverter.

Still another rotating machinery controller is disclosed in Japanese Patent Laid-open Publication (JP-A) No. 2003-235270.

However, in the instantaneous current value control described above, as the speed of the rotating machinery goes up toward a high rotational speed range, the actual current tends to deviate from the command current, making it difficult to generate the desired torque. During normal operation, the input voltage is larger than the back electric motive force (emf) and, hence, the rate of change of the actual current is sufficiently larger than that of the command current. Accordingly, the actual current can follow or tack the command current while changing little by little. In the high rotational speed range, however, phase shifting between the actual current flowing through the three-shape rotating machinery and the command current becomes significant. This is because the difference between the input voltage of the inverter and the back emf of the three-phase rotating machinery becomes small in the high rotational speed range, the rate of change of the actual current flowing through the three-phase rotating machinery is at the same level as the rate of change of the command current.

When the command current and the actual current are out of phase, a torque actually output from the three-phase rotating machinery deviates from the desired torque.

On the other hand, the rectangular wave control is able to control the output torque of the rotating machinery toward the desired torque even in the high rotational speed, high output torque ranges. However, in the rectangular wave control, the current flowing through the rotating machinery is controlled by an open-loop control system rather than a feedback control system. Thus, the rectangular wave control has a potential risk of allowing generation of an excessively large current. When such excessively large current flows through the rotating machinery, the reliability in operation of the switching devices of the inverter is deteriorated.

SUMMARY OF THE INVENTION

With the foregoing difficulties in view, an object of the present invention is to provide a rotating machinery controller, which is capable of properly controlling the output torque of a rotating machinery toward the desired torque.

To achieve the foregoing object, there is provided according to the present invention a rotating machinery controller for controlling a rotation-related physical quantity of a rotating machinery by operating switching devices of an inverter to supply electric power to the rotating machinery, the rotating machinery controller comprising: rectangular wave control means for controlling an output torque of the rotating machinery toward a desired torque by operating the switching devices such that an on-state and an off-state occur one time for one cycle period in electrical angle of the rotating machinery; instantaneous current value control means for, in order to control an actual current of the rotating machinery within a predetermined hysteresis region which is determined by a command current to the rotating machinery, operating the switching devices on the basis of a magnitude relation between upper and lower limits of the hysteresis region and the actual current; and switching means for, when a current flowing through the rotating machinery deviates from the hysteresis region while the control by the rectangular wave control means is undertaken, switching the control by the rectangular wave control means to the control by the instantaneous current value control means.

With this arrangement, when the control by the rectangular wave control means is performed, a maximum voltage utilization factor can be achieved, where the voltage utilization factor is represented by the ratio of a root-mean-square value of primary components of the phase voltage to the input voltage of the inverter. Accordingly, it is possible to properly control the output torque of the rotating machinery toward the desired torque even in a high rotational speed range or a high output torque range of the rotating machinery. However, the control by the rectangular wave control means is unable to perform feedback control of the actual current of the rotating machinery. Accordingly, when the rotational speed of the rotating machinery is sharply reduced to thereby cause a sudden fall in the induction voltage, a problem will arise in that the actual current increases excessively. In this instance, however according to the rotating machinery controller of the invention, the switching means changes the control to the control by the instantaneous current value control means, in which the actual current of the rotating machinery is properly feedback-controlled toward the desired torque. Reduction in controllability of the actual current can thus be avoided.

In one preferred form of the invention, the rectangular wave control means comprises: means for setting the command current of the instantaneous current control means to be a large-amplitude command current which is the same in period as, and larger in amplitude than, a current required to generate the desired torque; intersection estimation means for estimating an intersection time at which a value of the large-amplitude command current intersects a value of the required current; and forcing means for, if at the intersecting time, the change in operation state of the switching devices by the instantaneous current value control means has not taken place yet, forcibly changing the operation state of the switching devices.

In another preferred form of the invention, the instantaneous current value control means operates the switching devices based on the magnitude relation between the upper and lower limits of the hysteresis region determined by the command current and the actual current of the rotating machinery, so as to feedback-control the actual current of the rotating machinery toward a current required to generate the desired torque, and wherein the rotating machinery controller further comprises: setting means for setting the command current to be a large-amplitude command current which is the same in period as, and larger in amplitude than, the required current; intersection estimation means for estimating an intersection time at which the large-amplitude command current intersects the required current; and forcing means for, if at the intersection time, the operation state of the switching devices has not been changed by the instantaneous current value control means, forcibly changing the operation state of the switching devices.

When the control by the instantaneous current value control means is performed by using the large-amplitude command current, due to the large amplitude of the command current, the actual current deviate from the hysteresis region at a time located near the intersection time at which the actual current intersects the command current. In this instance, since the operation state of the switching devices is switched or changed from one state to the other at the near-intersection time, it is possible to operate the switching devices through the control by the instantaneous current value control means in such a manner that the on-state and the off-state occur once for one cycle period in electrical angle of the rotating machinery. Furthermore, by properly adjusting the phase of the large-amplitude command current, it is readily possible to adjust the intersection time and the switching phase of the switching devices, which is dependent on the intersection time. Thus, the actual current of the rotating machinery is properly controlled toward the command current.

In this instance, however, since for a period from the actual current deviates from the hysteresis region to the next control time of the instantaneous current value control means, the operating state of the switching device cannot be changed by the instantaneous current value control means. Accordingly, the switching time at which the operation state of the switching devices is changed by the instantaneous current value control means with the use of the large-amplitude command current may lag behind a switching time at which the operation state of the switching device is changed by the rectangular wave control means to generate the desired torque. However, according to the invention, the operation state of the switching devices is forcibly changed at the intersection time at which the large-amplitude command current intersects the required current. With this forced switching in operation state of the switching devices, the rectangular wave control can be properly performed while the instantaneous current value control means takes a part in the rectangular wave control.

The rotating machinery controller may further comprise inhibiting means for inhibiting the change in operation state of the switching devices by the instantaneous current value control means from occurring for a predetermined period of time after the forced changing by the forcing means has taken place.

At a time immediately after the forced changing is effected by the forcing means, an operation command for operating the switching devices by the instantaneous current value control means is considered to be contradictory to the operation command used for effecting the forced switching by the forcing means. Under such condition, if operation by the instantaneous current value control means to change the state of the switching devices were permitted, the operation state of the switching devices would be changed again by the instantaneous current value control means even through the switching phase of the switching devices has already changed to a value proper to generate the desired torque under the rectangular wave control. Such problem will never occur in the rotating machinery controller of the present invention because the inhibiting means is provided to inhibit the occurrence of a change in operation state of the switching devices by the instantaneous current value control means for a predetermined period after the forced switching by the forcing means is effected.

The predetermined inhibition period is preferably smaller than half cycle ($2\pi/w$) of the command current (corresponding to ½ revolution of electrical angle as occurred with rotation of the rotating machinery). The inhibition period may be variable depending on the setting of the hysteresis width but preferably it is in the range of 20 to 200 μs.

Preferably, the intersection estimation means comprises: current value estimation means for estimating a value of the large-amplitude command current and a value of the required current at the next control time of the instantaneous current value control means; determination means for, on the basis of a change in magnitude relation of the large-amplitude command current and the required current as occurring between values at the current control time and the estimated values at the next control time, determining whether the intersection time occurs before the next control time; and necessary time calculation means for, when the determination by the determination means shows that the intersection time occurs before the next control time, for calculating a necessary time that elapses before the next control time.

In the case where the large-amplitude command current intersects the required current before the next control time, it should be considered that the magnitude relation of the large-amplitude command current and the required current is reversed as for the values taken at the current control time and values at the next control time. Taking this into account, the determination by the intersection determination means and the calculation by the necessary time calculation means can be performed with reliability and accuracy.

It is preferable that the forcing means forcibly changes the operation state of the switching devices on condition that the magnitude relation of the large-amplitude command current and the required current differs from one another as for values at the preceding control time and the values at the current control time, and the operation state of the switching devices has not been changed throughout a period between the preceding control time and the current control time.

If the estimation made by the current value estimation means involves an error, it may occur that the determination made by the determination means is contradictory to what is actually happening and a forced switching operation of the switching devices is omitted or skipped, creating a lag in operation of the switching devices. To deal with this problem, the forcing means is arranged to forcibly change the operation state of the switching devices on condition that the magnitude relation of the large-amplitude command current and the required current differs from one another as for the values taken at the preceding control time and the values at the current control time, and the operation state of the switching devices has not changed throughout a period between the preceding control time and the current control time.

Preferably, the instantaneous current value control means includes output means for, with a current required to generate the desired torque being set to be the command current, outputting a distinct logic value each time when the actual current is larger than the upper limit of the hysteresis region, when the actual current is contained within the hysteresis region, and when the actual current is smaller than the lower limit of the hysteresis region, and wherein the switching means conduct the switching based on the logic value output from the output means.

With this arrangement, when the actual current deviates from the hysteresis region while the rectangular wave control is undertaken, the nature of such deviation can be correctly determined based on the logic value output from the output means. By thus determining the deviation, instantaneous current value control is performed in combination of the rectangular wave control so that the actual current is properly controlled toward the required current.

It is preferable that the hysteresis region is variably set according to the desired torque and a rotational speed of the rotating machinery.

As the hysteresis width (i.e., the width between the upper and lower limits of the hysteresis region) is reduced, the amount of deviation or offset of the actual current from the required current decreases. However, if the hysteresis width is unduly narrowed or reduced, then the actual current will deviate from the hysteresis region even when the rectangular wave control is normally performed. This will deteriorate the performance of the rectangular wave control and lower the voltage utilization factor. While the rectangular wave control is properly performed, the maximum value of the deviation or offset between the actual current and the required current varies with the rotational speed and the desired torque of the rotating machinery. In view of this, the hysteresis region of the present invention is set to be variable with the rotational speed and the desired torque of the rotating machinery with the result that the rectangular wave control can be normally performed while keeping good follow-up or tracking capability of the actual current relative to the required current.

The hysteresis region may be set to contain the actual current, which appears when the difference between the command current and the actual current has a maximum value while the rectangular wave control is normally performed. By thus setting the hysteresis region, the actual current gives no adverse effect to the rectangular wave control.

Preferably, the rectangular wave control means comprises: intersection estimation means for estimating an intersection time at which a large-amplitude command current which is the same in period as, and larger in amplitude than, the required current intersects the required current; and means for conducting the change in operation state of the switching devices at the intersection time estimated by the intersection estimation means.

With this arrangement, it is possible to define the switching timing of the switching devices during the rectangular wave control by the timing at which the large-amplitude command current becomes the required current.

It is preferable that the intersection estimation means comprises: current value estimation means for estimating a value of the large-amplitude command current and a value of the required current at the next control time of the rectangular wave control means; determination means for, on the basis of a change in magnitude relation of the large-amplitude command current and the required current as occurring between values at the current control time and the estimated values at the next control time, determining whether the intersection time occurs before the next control time; and necessary time calculation means for, when the determination by the determination means shows that the intersection time occurs before the next control time, for calculating a necessary time that elapses before the next control time.

The rotating machinery controller according may further comprise: means for, with respect to each of the large-amplitude command current and the required current, setting values in a static coordinate system; and conversion means for converting the values in the static coordinate system into values in a rotational coordinate system. The current value estimation means comprises: means for performing a temporal differentiation of the large-amplitude command current and the required current based on output signals from the conversion means with the values in the static coordinate system being input signals to the conversion means; and means for, on the basis of the result of the temporal differentiation, calculating the large-amplitude command current and the required current at the next control time using Taylor's series of predetermined degree. Preferably, the predetermined degree of the Taylor's series is a first degree or a second degree.

When the values in the static coordinate system are converted into the values in the rotational coordinate system to calculate the large-amplitude command current and the required current, such conversion is normally defined by trigonometric function. Thus, the large-amplitude command current and the required current are represented by differentiable curves, and their values after a lapse of a predetermined time can be approximated by using Taylor's series. Temporal differentiation of the large-amplitude command current and the required current can be performed by using the conversion means based on the values in the static coordinate system. In other words, by way of a conversion process performed by the conversion means for converting the values in the static coordinate system into the values in the rotational coordinate system, an arithmetic operation equivalent to the differentiation can be performed. Thus, according to the invention, Taylor's series of predetermined degree can be readily calculated, which will ensure easy estimation of the large-amplitude command current and the required current at the next control time.

The rotating machinery controller may further comprise: means for, with respect to each of the large-amplitude command current and the required current, setting values in a static coordinate system; and conversion means for converting the values in the static coordinate system into values in a rotational coordinate system. The current value estimation means comprises means for calculating the product of a time period between the adjacent control times multiplied by a current electric angular velocity of the rotating machinery, and the current value estimation means estimates the large-amplitude command current and the required current at the next control time through conversion performed by the conversion means with respect to values set in the static coordinate systems for each of the large-amplitude command and the required current at the current control time while using an electric angle which is leading the current electrical angle by the product calculated by the calculating means.

With this arrangement, the large-amplitude command current and the required current at the next control time can be readily obtained by calculation using an electrical angle, which is leading the current electric angle value by the product of a time period between the adjacent control times multiplied by a current electric angular velocity of the rotating machinery, when values of the large-amplitude command current and the required current are converted into values in the rotational coordinate system.

Preferably, the rectangular wave control means comprises: timer means for measuring a time elapsed after the calculation of the necessary time by the necessary time calculating means; and means for performing the switching when a time measured by the timer means and the necessary time are in agreement.

It is preferable that the amplitude of the large-amplitude command current is set to be greater than or equal to $Ad/(\omega min \times Tc)$ where Tc is the timing period of the timer means, Ad is the minimum unit quantity of the large-amplitude command current, and $\omega min$ is the minimum electrical angular velocity of the rotating machinery when the large-amplitude command current is used.

By the use of the time intervals between control times (control period T) and the timing period Tc of the timer, the number of timing operations performed during a single control period T can be expressed as: $T/Tc$. On the other hand, by using the minimum unit quantity Ad, the electrical angular velocity $\omega$ and the amplitude A2 of the large-amplitude command current, the number of large-amplitude command current increments performed during a single control period T can be expressed as: $\omega \times A2 \times T/Ad$. Assuming that the change in the required command current during the control period T is negligible, the intersection time at which the large-amplitude command current intersects the required current can be calculated with accuracy at least comparable to the accuracy of the timing operation provided that $\omega \times A2 \times T/Ad \geq T/Tc$. From this, we can obtain $A2 \geq Ad/(\omega \times Tc)$. As is apparent from the foregoing inequality, the right member increases as $\omega$ decreases. Thus, using the minimum electrical angular velocity $\omega min$ at the time the large-amplitude command current is selected, required conditions for the amplitude A2 can be expressed as: $Ad/(\omega min \times Tc)$.

Preferably, the necessary time is calculated as the quotient of the difference between the large-amplitude command current and the necessary current divided by the difference between a temporal derivative value of the large-amplitude command current and a temporal derivative value of the required current.

The necessary time can be easily calculated through linear approximation of the large-amplitude command current and the required current during a short time period between the current control time and the next control time. If a converting means for converting values in the static coordinate system into values in the rotational coordinate system is provided for calculating the large-amplitude command current and the required current, the converter can be also used for calculating temporal derivative values.

It is preferable that the amplitude of the large-amplitude command current is less than or equal to a value which is obtained as the product of a maximum rated current of the inverter multiplied by the square root of 2.

By thus setting the amplitude of the large-amplitude command current, when the absolute value of a current flowing in the inverter exceeds the maximum rated current, the actual current deviates from the hysteresis region determined by the large-amplitude command current. Thus, a feedback control is performed so that the absolute value of the actual current is reduced. As a result, the current flowing in the inverter is kept from exceeding the maximum rate current.

Preferably, the intersection time at which the large-amplitude command current intersects the required current is coincident with a switching time at which the operation state of the switching devices is changed from one state to the other so as to realize the desired torque through operation of the switching devices to cause the on-state and the off-state occur once for one cycle period in electrical angle of the rotating machinery.

The operation state of the switching devices is switched or changed by the instantaneous current value control at a time located close to the intersection time at which the large-amplitude command current intersects the required current. In this instance, the intersection time is coincident with the switching time at which the operation state of the switching devices is changed by the rectangular wave control so as to realize the desired torque. With this arrangement, the operation state of the switching devices can be changed by the instantaneous current value control at a timing substantially the same as the switching timing of the rectangular wave control.

It is preferable that the phase T2 of the large-amplitude command current is set to satisfy the equation given below:

$$T2=T3-\arcsin\{(A1/A2)\times\sin(T3-T1)\}$$

where A1 is the amplitude of the required current, A2 is the amplitude of the large-amplitude command current, T1 is the phase of the desired torque, and T3 is the switching phase in which the operating state of the switching devices is changed from the on-state to the off-state and vice versa to realize the desired torque through operation of the switching devices to cause the on-state and the off-state to occur once for one cycle period in electrical angle of the rotating machinery.

Using the electrical angular velocity w of the rotating machinery, the required current can be expressed as: $A1 \times \sin(wt-T1)$, and the large-amplitude command current can be expressed as: $A2 \times \sin(wt-T2)$. Assuming that the large-amplitude command current and the required current cross each other at the phase T3, we have: $A1 \times \sin(T3-T1)=A2 \times \sin(T3-T2)$.

From the foregoing expressions, the phase T2 can be calculated from the equation given above. According to the invention, it is readily possible to change or switch the operation state of the switching devices at the phase T Preferably, the control by the rectangular wave controller is performed when at least one of a rotational speed and an output torque of the rotating machinery is greater than or equal to a predetermined value.

With this arrangement, in a high rotational speed range or a high output torque range of the rotating machinery, the rectangular wave control is performed with the result that power loss can be reduced and the voltage utilization factor is increased.

DETAILED DESCRIPTION OF THE PREFERRED EMBODIMENTS

First Embodiment

A first preferred embodiment of the present invention will be described hereinbelow in detail with reference to the accompanying sheets of drawings, wherein a rotating machinery controller according to the present invention is shown as applied to a controller for a three-phase motor mountable to a hybrid car.

Figure 1:
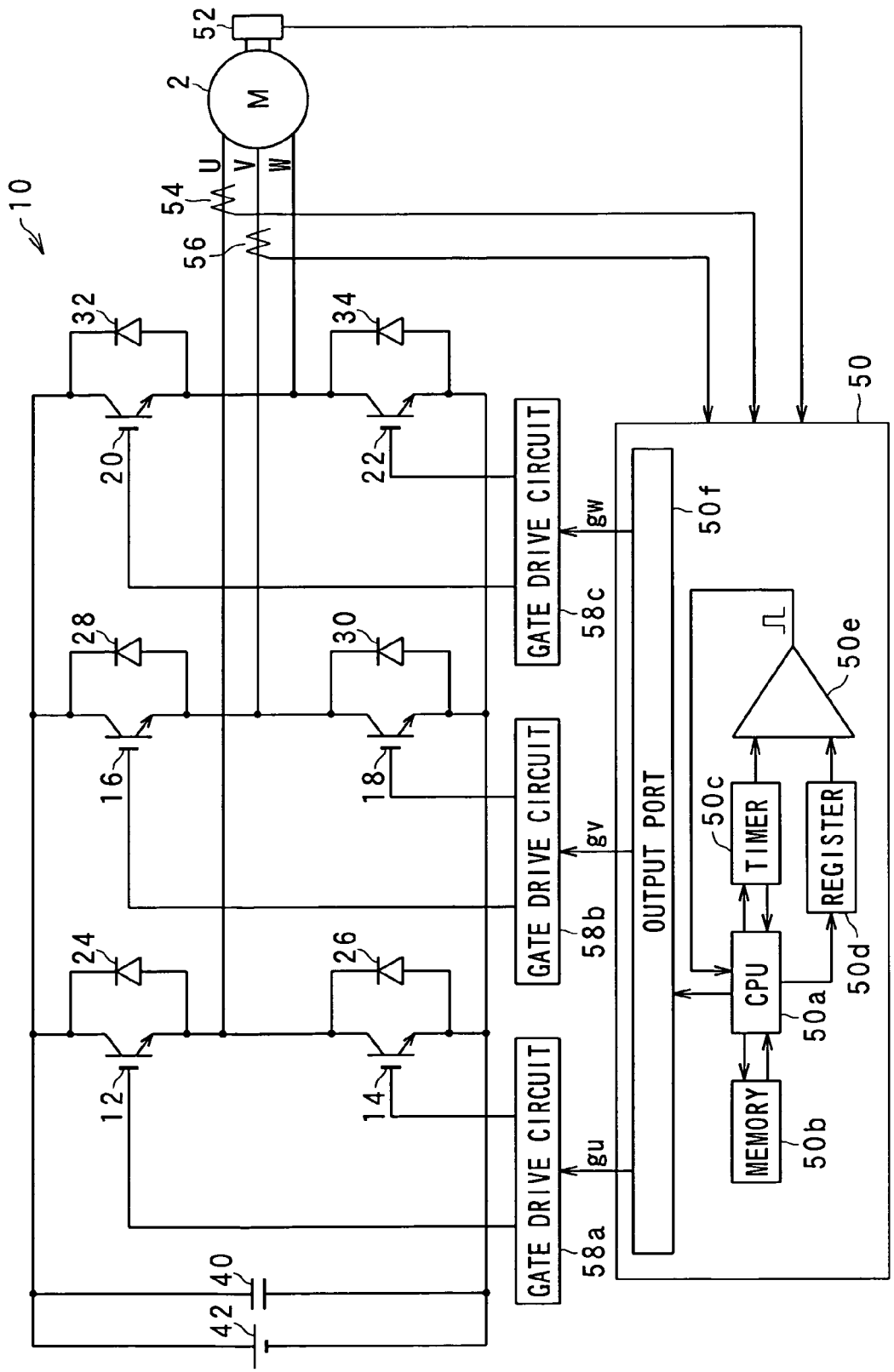
FIG. 1 is a circuit diagram showing the general configuration of a rotating machinery controller according to a first embodiment of the present invention, including an inverter and a microcomputer used in combination for controlling a motor.

FIG. 1 shows the general configuration of the three-phase motor and the controller used in combination. As shown in FIG. 1, the three-phase motor comprises a DC brushless motor 2 having three phases (U-phase, V-phase and W-phase) connected to an inverter 10. The inverter 10 comprises a three-phase inverter having three pairs of switching devices 12 and 14, 16 and 18, and 20 and 22 connected in parallel and provided each for a respective one of the three phases U, V and W. The inverter 10 also includes diodes 24, 26, 28, 30, 32 and 34 connected in inverse-parallel to the respective switching devices 12, 14, 16, 18, 20 and 22. The switching devices 12 and 14 are connected in series, and the connection between the series-connected switching devices 12 and 14 is connected to the U-phase of the motor 2. Similarly, the switching devices 16 and 18 are connected in series, and the connection between the series-connected switching devices 16 and 18 is connected to the V-phase of the motor 2. Furthermore, the switching devices 20 and 22 are connected in series, and the connection between the series-connected switching devices 20 and 22 is connected to the W-phase of the motor 2. The switching devices 12-22 in this embodiment consist of insulated gate bipolar transistors (IGBT).

The voltage from a battery 42 is applied through a smoothing capacitor 40 to the opposite ends of each pair of switching devices 12 and 14, 16 and 18, and 20 and 22 of the inverter 10.

A microcomputer 50 comprises a central processing unit (CPU) 50a, a memory 50b including a read-only memory (ROM), a random access memory (RAM), etc., a timer 50c, a register 50d, an agreement detection device or circuit 50e, and an output port 50f. In addition to a regular operation cycle period, the CPU 50a also uses a leading edge of the agreement detection circuit 50e as a trigger to execute a program stored in the ROM of the memory. While the program is executed, various operation parameter values are temporarily stored in the RAM of the memory 50b. The agreement detection circuit 50e has two input signals representing a value of the register 50d set by the CPU 50a to a given value and a value of the timer 50c increasing at regular time intervals and, when these input values are equal or in agreement, the agreement detection circuit 50e outputs a pulse signal of logic 1.

The microcomputer 50 reads detection results from a position sensor 52, which detects a rotational angle of the output shaft of the motor 2, and from current sensors 54, 56, which detect currents flowing respectively through the U-phase and V-phase of the motor 2. The microcomputer 50 calculates from the currents flowing through the U-phase and V-phase, a current flowing through the W-phase based on the Kirchhoff's law. Furthermore, on the basis of the rotational angle of the output shaft of the motor 2 and the currents flowing through the respective phases U, V, W of the motor 2, the microcomputer 50 operates the switching devices 12-22 so as to control a rotation-related physical quantity (such as an output torque on the output shaft) of the motor 2.

Figure 2:
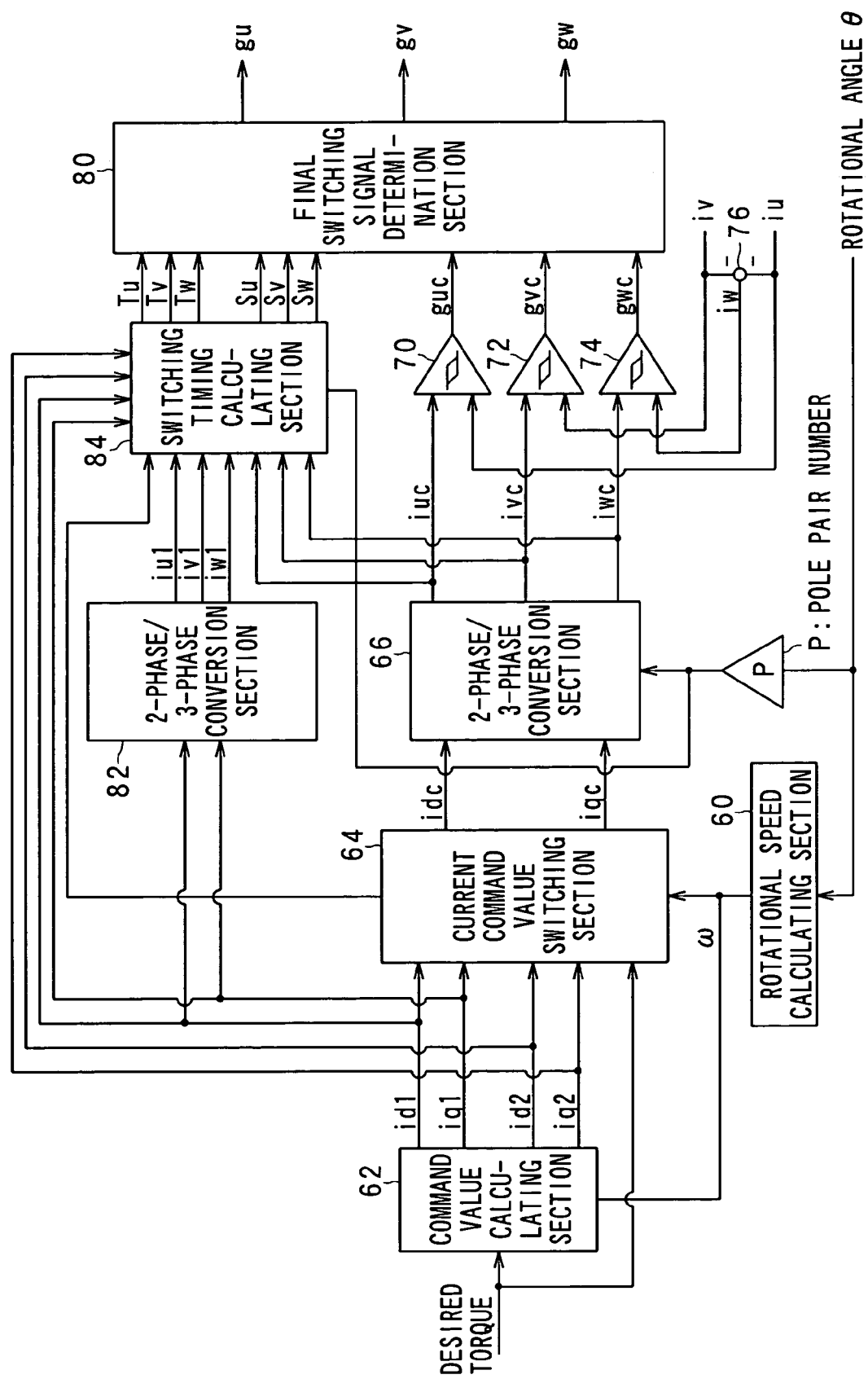
FIG. 2 is a functional block diagram showing processes to be performed by the microcomputer according to the first embodiment of the invention.

FIG. 2 is a functional block diagram showing functional sections of the microcomputer 50 for performing a process pertaining to the generation of operation signals used for operating the switching devices 12-22.

In FIG. 2, a rotational speed calculating section 60 is a functional part which calculates a rotational speed of the motor 2 on the basis of a rotational angle θ of the motor 2 detected by the position sensor 52. A dq-axis current command value calculating section 62 is a functional part which on the basis of the rotational speed calculated by the rotational speed calculating section 60 and an externally-retrieved desired torque, calculates first command values id1, iq1 which are desired d-q axes currents for generating the desired torque. The dq-axis current command value calculating section 62 also calculates dq-axes second command values id1, iq2 on the basis of the rotational speed calculated by the rotational speed calculating section 60 and the desired torque taken from the external source.

A current command value switching section 64 is a functional part which selects and outputs either of the first command values id1, iq1 or the second command values id2, iq2. A two-phase/three-phase conversion section 66 is a functional part which converts final dq-axes command values idc, iqc selected by the current command value switching section 64 into command currents iuc, ivc, iwc in the three-phase system. In the two-phase/three-phase conversion, an electrical angle is used, which is the product of the rotational angle θ of the motor 2 detected by the position sensor 5 multiplied by a number of pairs of poles p of the motor 2.

The command currents iuc, ivc, iwc are input to corresponding hysteresis comparators 70, 72, 74. The hysteresis comparators 70, 72, 74 also take in an actual current iu detected by the current sensor 54, an actual current iv detected by the current sensor 56, and an actual current iw calculated by a subtracting section 76 as the product of the sum of the actual currents iu and iv multiplied by −1.

The hysteresis comparator 70 outputs a drive pulse guc based on a magnitude relation of upper and lower limits of a hysteresis region determined by the command current iuc with the actual current iu. A final switching signal determination section 80 determines, under predetermined conditions, the drive pulse guc to be an operation signal gu for switching the operation state of the power switching devices 12, 14. Similarly, the hysteresis comparator 72 outputs a drive pulse gvc based on a magnitude relation of upper and lower limits of a hysteresis region determined by the command current ivc with the actual current iv. The final switching signal determination section 80 determines, under predetermined conditions, the drive pulse gvc to be an operation signal gv for switching the operation state of the power switching devices 16, 18. Yet, the hysteresis comparator 74 outputs a drive pulse gwc based on a magnitude relation of upper and lower limits of a hysteresis region determined by the command current iwc with the actual current iw. The final switching signal determination section 80 determines, under predetermined conditions, the drive pulse gwc to be an operation signal gw for switching the operation state of the power switching devices 20, 22. When the operation signals gu, gvm gw are logic high levels, the gate drive circuits 58a, 58b, 58c shown in FIG. 1 place the switching devices 12, 16, 20 on upper branches or arms in an On-state and the switching devices 14, 18, 22 on lower arms in an Off-state. Alternatively, when the operation signals gu, gvm gw are logic low levels, the gate drive circuits 58a, 58b, 58c place the switching devices 12, 16, 20 on the upper arms in the Off-state and the switching devices 14, 18, 22 on the lower arms in the On-state.

Figure 3:
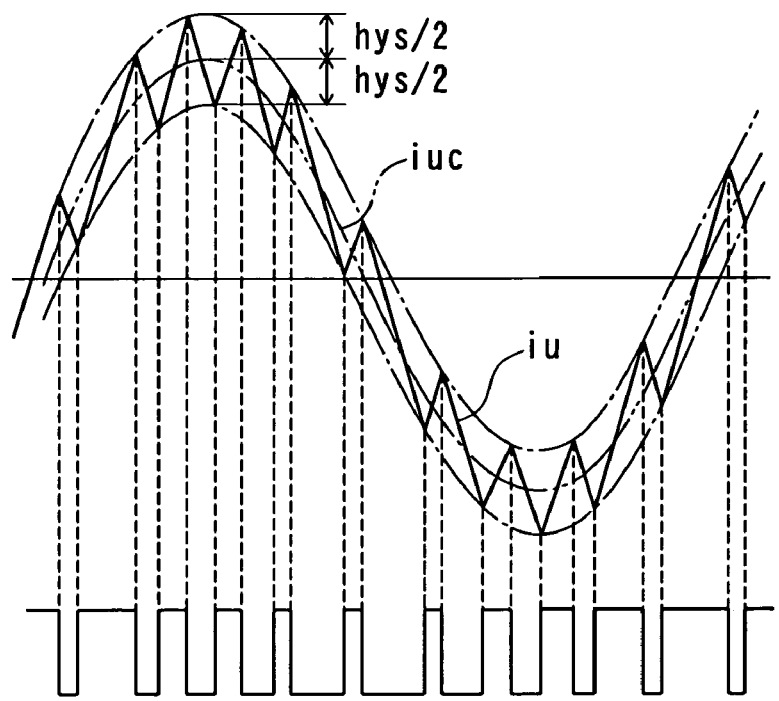
FIG. 3 is a time chart illustrative of the manner in which the instantaneous current value control is performed according to the first embodiment of the invention.

Thus, as shown in FIG. 3 (where only the U-phase is shown for convenience of explanation), the actual current iu is controlled to fall within a region (hysteresis region) defined between a value which is larger than the command current iuc by half of the hysteresis width hys and a value which is smaller than the command current iuc by half of the hysteresis width hys.

When performing instantaneous current value control in which the actual currents iu, iv, iw are controlled by a feedback control system to fall within the respective hysteresis regions determined by the command currents iuc, ivc, iwc, the control in a high rotational speed range of the motor 2 tends to become the so-called "rectangular waveform control" in which the period (or frequency) of the current flowing through the motor 2 (more properly, the period of the command currents iuc, ivc, iwc) and the period (frequency) of the drive pulse gu, gv, gw are the same. In the rectangular wave control, the voltage utilization factor, which is represented by the ratio of a root-mean-square value of primary components of inter-phase voltages applied to the motor 2 to an input voltage (voltage of the battery 42) of the inverter 10, theoretically reaches a maximum value. However, in the high rotational speed range of the motor 2, back electric motive force (emf) of the motor 2 comes near the input voltage of the inverter 10. As a consequence, phase shifting occurs between the actual currents iu, iv, iw and the corresponding command currents iuc, ivc, iwc, making it difficult to obtain the desired motor torque as previously discussed.

To deal with this difficulty, the illustrated first embodiment of the present invention is arranged such that in a high rotational speed range of the motor 2, the first command values id1, iq1 to generate the desired torque are replaced by the second command values id2, iq2 to thereby perform the instantaneous current value control. By thus using the second command values id2, iq2, three-phase command currents iuc2, ivc2, iwc2 are generated in the manner shown in FIG. 4 where only the U-phase is illustrated for convenience of explanation.

The three-phase second command currents iuc2, ivc2, iwc2 are larger in amplitude than, and out of phase with, the three-phase first command currents iuc1, ivc1, iwc1, respectively. The second command currents iuc2, ivc2, iwc2 are calculated based on the first command currents iuc1, ivc1, iwc1 and proper drive pulses gua, gva, gwa to generate the desired torque by the rectangular wave control.

More particularly, the second command currents iuc2, ivc2, iwc2 are generated in such a manner that the intersection timing between the second command currents iuc1, ivc2, iwc2 and the first command currents iuc1, ivc1, iwc1 is the same as the inversion timing of the proper drive pulses gua, gva, gwa used for generating the desired torque by the rectangular wave control. With this arrangement, drive pulses guc, gvc, gwc generated by the instantaneous current value control resemble closely or approximate the drive pulses gua, gva, gwa that can generate the desired torque under the rectangular wave control.

At a time point t1, the second command current iuc2 is smaller than the first command current iuc1. In this instance, if the actual current follows a required current (i.e., the first command current iuc1) for producing the desired torque, the drive pulse guc output from the hysteresis comparator 72 with the use of the second command current iuc2 will be logic low level. Thereafter, the second command current iuc2 intersects the first command current iuc1 whereupon the magnitude relation between the actual current iu and the second command current iuc2 is reversed. Now, by increasing the amplitude of the second command current iuc2, the drive pulse guc output from the hysteresis comparator 72 will cause logical inversion in the vicinity of a time point t2. Thus, the drive pulse guc can be used as a pulse signal for generating the desired torque in the rectangular wave control.

Figure 4:
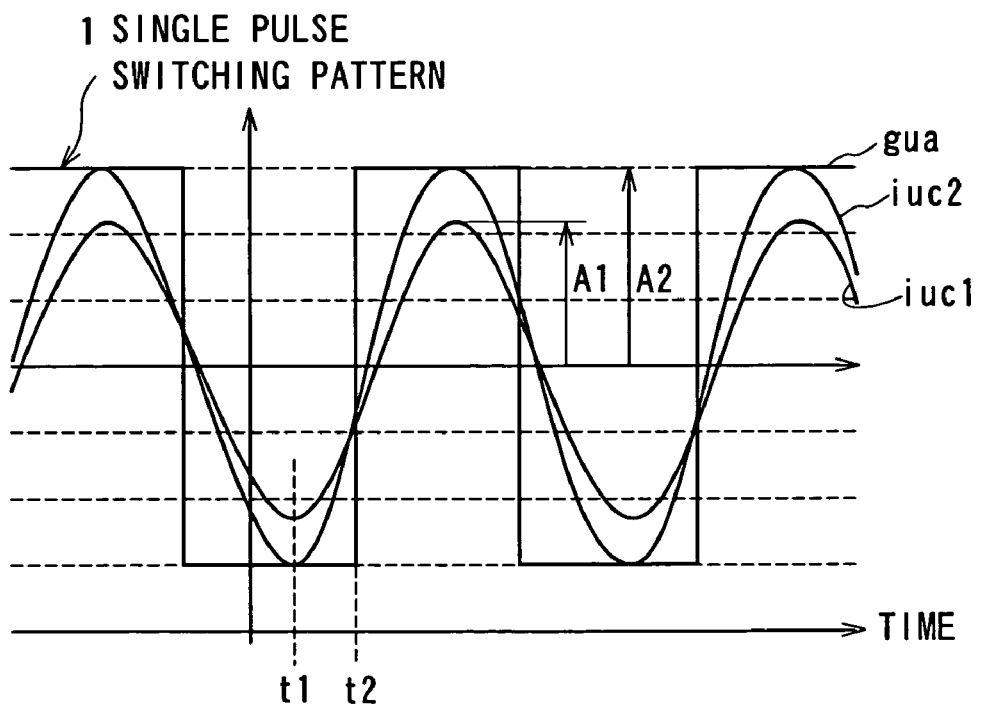
FIG. 4 is a time chart explanatory of a second command current generating technique according to the first embodiment of the present invention.

In FIG. 4, the drive pulse gua has a crest value corresponding to the crest value of the second command current iuc2. However, this matching in crest value is done, merely for the sake of convenience, by adjusting the voltage reference of the drive pulse gu and the current reference of the second command current iuc2.

A processing technique taken by the microcomputer 50 to perform the instantaneous current value control on the basis of the second command currents will be described with reference to flowcharts shown in FIGS. 5 and 6.

Figure 5:
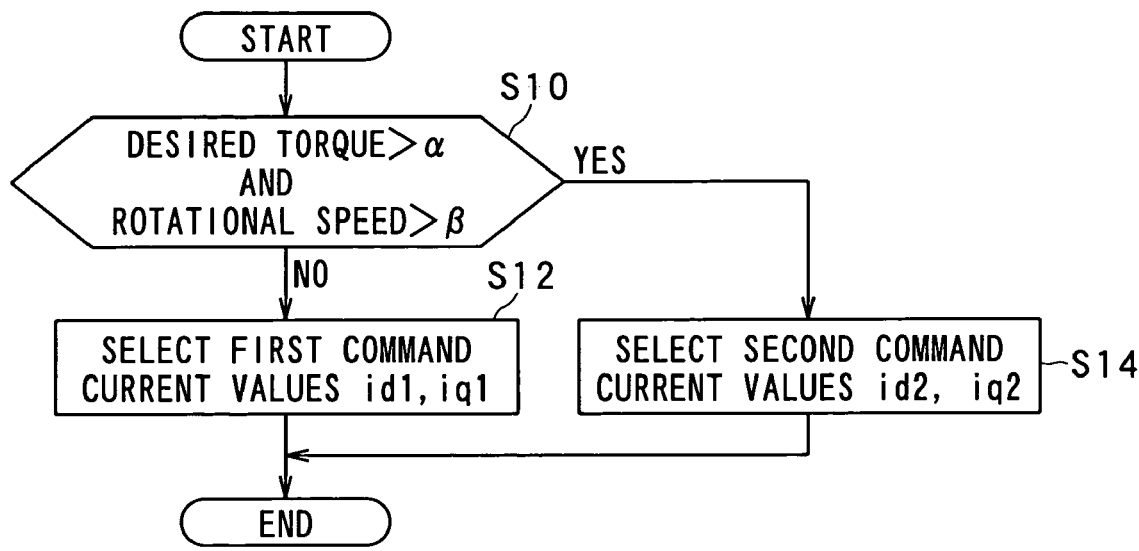
FIG. 5 is a flowchart showing a processing procedure relating to the switching between the control using first command values and the control using second command values according to the first embodiment of the present invention.

FIG. 5 is a flowchart showing a sequence of operations performed by the current command value switching section 64 (FIG. 3). The operation sequence is executed repeatedly at predetermined intervals of time.

Operation begins at step S10, which determines whether the desired torque is greater than a prescribed torque $\alpha$ and the rotational speed is greater than a prescribed rotational speed $\beta$. This determination is made to determine whether or not a back emf of the motor 2 and an input voltage of the inverter 10 approximate each other. If the determination at step S10 shows that the desired torque is not greater than the prescribed torque $\alpha$ and/or the rotational speed is not greater than the prescribed rotational speed $\beta$, the procedure goes on to step S12 where first command values id1, iq1 are selected. Alternatively, if the determination in step S10 indicates that the desired torque is greater than the prescribed torque $\alpha$ and the rotational speed is greater than the prescribed rotational speed $\beta$, the procedure is branched to step S14 where second command values id2, iq2 are selected.

Figure 6:
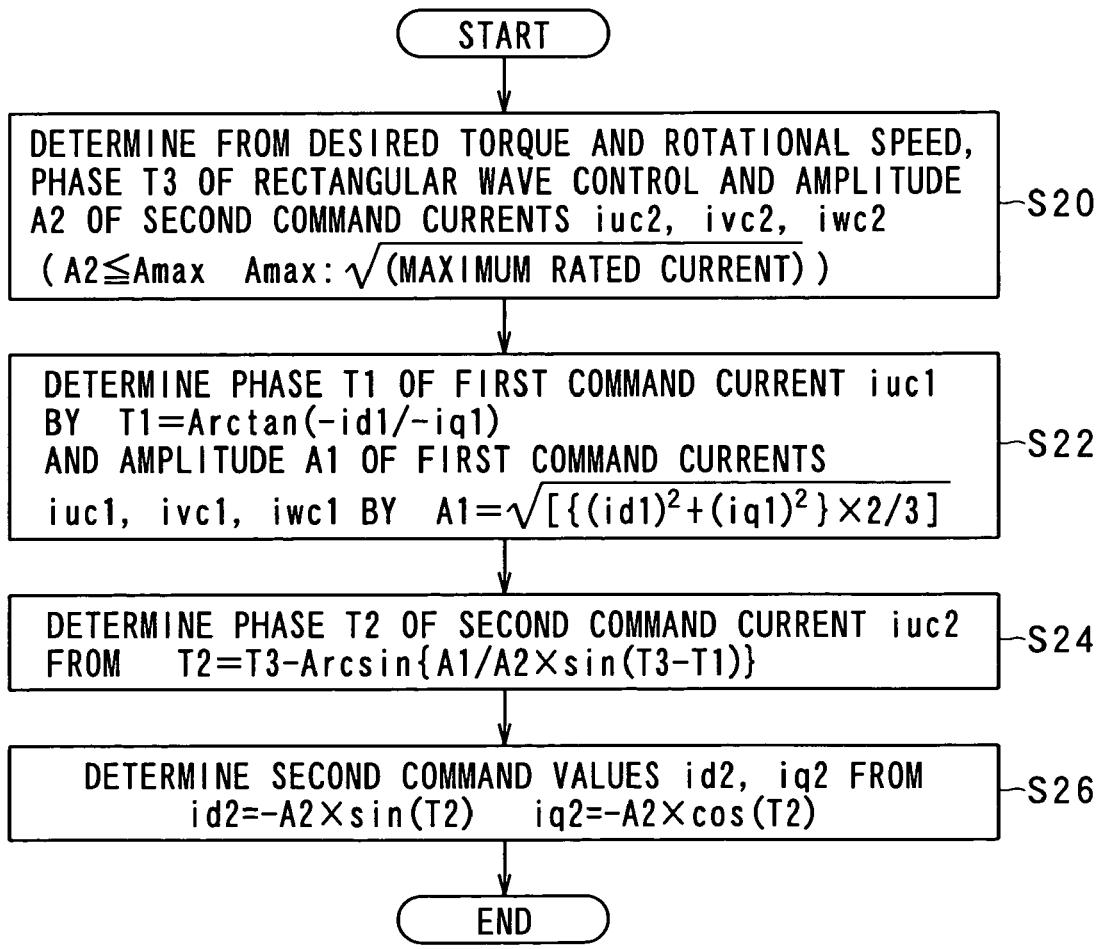
FIG. 6 is a flowchart showing a procedure relating to generation of the second command values according to the first embodiment of the invention.

FIG. 6 is a flowchart showing a procedure to be executed by the dq-axis current command value calculating section 62 (FIG. 3) to calculate the first command values id1, iq1 and the second command values id2, iq2. This procedure is executed repeatedly at a predetermined cycle period when the determination result in step S10 shown in FIG. 5 is affirmative.

The procedure begins at step S20, which calculates from the desired torque and the rotational speed, turn-on timing (switching phase T3) of the switching devices 12-22 and amplitude A2 of the second command currents in a three-phase system. In this instance, the switching phase T3 of the rectangular wave control is determined based on a correlation between the stitching phase T3 and the desired torque and a correlation between the switching phase T2 and the rotational speed that are determined in advance by simulation or experiment. The amplitude A2 of the second command currents is preferably less than or equal to a value Amax which is obtained as the product of a maximum rated current of the inverter 10 multiplied by the square root of 2. Thus, when the current flowing through the motor 2 takes the value Amax, the current flowing through the inverter 10 is equal to the maximum rated current. With the amplitude A2 set to be less than or equal to the value Amax, when the current flowing through the motor 2 exceeds the maximum rated current, a feedback control is performed by the instantaneous current value control to lower the level of the motor current. The motor current can thus be kept from exceeding the maximum rated current of the inverter 10. The amplitude A2 of the second command currents may be a fixed value, however, it is preferable that the amplitude A2 is variable in direct proportion to the amplitude A1 of the first command currents. This arrangement makes it possible to prevent the actual currents iu, iv, iw from deviating largely from the required current values (first command currents) to generate the desired torque.

The foregoing step S20 is followed by step S22 in which a phase T1 of the first command current iuc1 and the amplitude A1 of the first command currents iuc1, ivc1, iwc1 are calculated. The first command current iuc1 can be expressed by using an electrical angular velocity w as:

$$iuc1 = A1 \times \sin(w \times t - T1) \qquad (c1)$$

The electrical angular velocity w is defined by using a number of pole pairs of p of the motor 2 and a rotational speed $\omega$ (rpm) as: w=2$\pi$p$\omega$/60. Furthermore, the phase T1 is defined as: T1=arctan(-id1/-iq1). The amplitude A1 is the square root of the sum of id1 squared and iq1 squared multiplied by ⅔, where id1 is the first command value on the d-axis, and iq1 is the first command value on the q-axis.

In the next step S24, a phase T2 of the second command current iuc2 is calculated. The second command current iuc2 can be expressed as:

$$iuc2 = A2 \times \sin(w \times t - T2) \qquad (c2)$$

Considering the switching phase T3 as a phase in which equation (c1) equals equation (c2), we have A1×sin(T3−T1)=A2×sin(T3−T2).

Therefore, the phase T2 can be calculated from the equation (c3) given below.

$$T2 = T3 - \arcsin\{(A1/A2) \times \sin(T3 - T1)\} \qquad (c3)$$

Then, the procedure advances to step S26 in which the second command values id2, iq2 are calculated from the following equations:

$$id2 = -A2 \times \sin(T2)$$

$$iq2 = -A2 \times \cos(T2)$$

Figure 7:
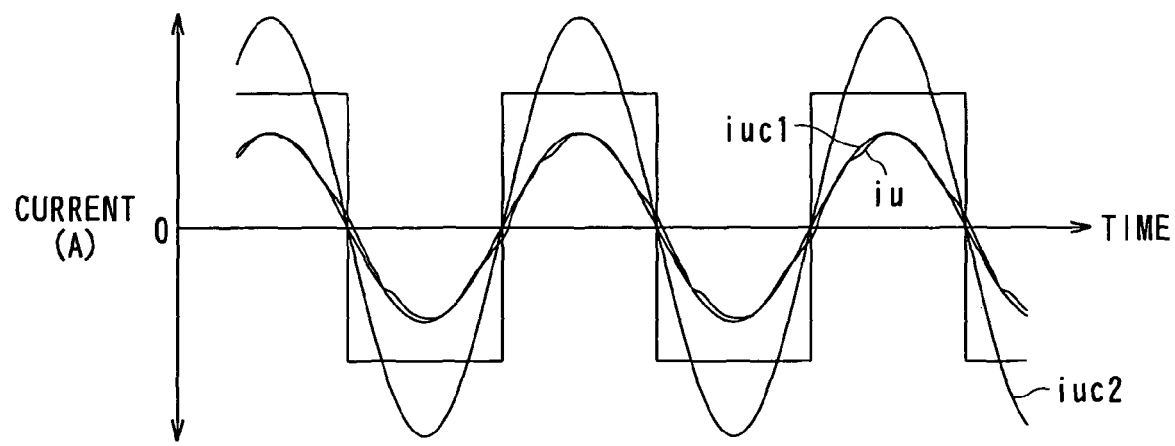
FIG. 7 is a time chart illustrative of the manner in which current flowing through the motor follows up or tracks the required current by the instantaneous current value control according to the first embodiment of the present invention.
Figure 8:
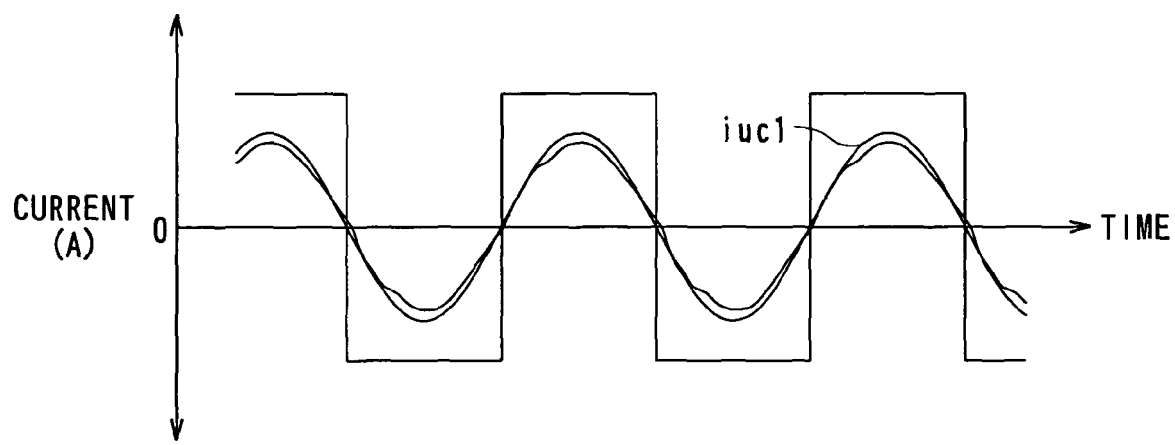
FIG. 8 is a time chart showing the manner in which current flowing through the motor follows up or track the required current according to the conventional instantaneous current value control.

FIG. 7 shows a simulation result obtained from simulation about the behavior of an actual current observed during the instantaneous current value control using the aforesaid second command values id2, iq2. The simulation result shown in FIG. 7 is limited to only the U-phase for convenience of explanation. As shown in this figure, the actual current iu exhibits good follow-up or tracking capability relative to the first command current iuc1 which is a current required to generate the desired torque. For comparative purposes, an actual current behavior simulation result obtained from the instantaneous current value control performed in conjunction with a high rotational speed range of the motor 2 by using the first command current is shown in FIG. 8. In this case, the follow-up or tracking capability of the actual current iu with respect to the first command current iuc1 is poor and, therefore, the output torque of the motor 2 deviates from the desired torque.

By thus performing the instantaneous current value control with the use of the second command currents iuc2, ivc2, iwc2, the instantaneous current value control is able to simulate the rectangular wave control. However, when the instantaneous current value control is employed, since the switching timing of the operation state of the switching devices 12-22 depends on an interval of time between successive control operations (i.e., control period), the switching timing may lag behind the timing as required by the rectangular wave control. This problem will be discussed below in further detail.

Figure 9:
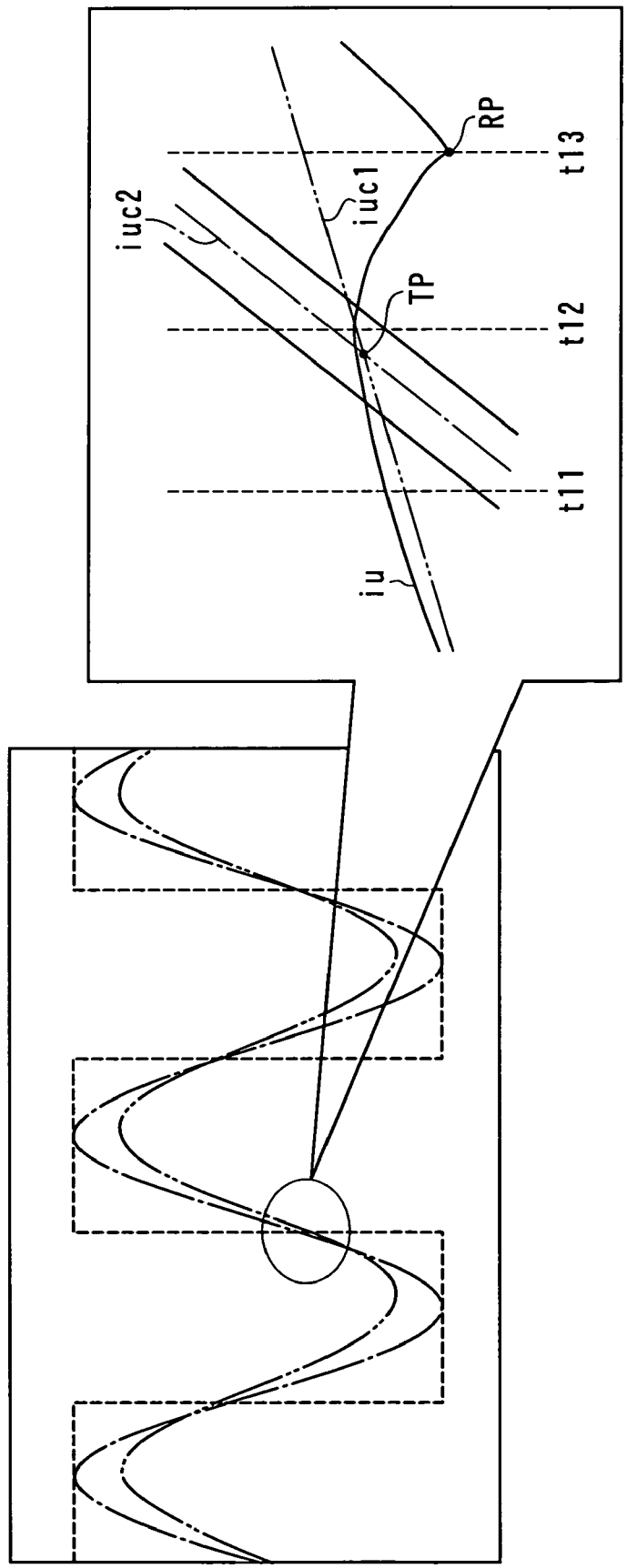
FIG. 9 is a partially enlarged time chart showing a problem involved in the instantaneous current value control according to the first embodiment of the invention.

FIG. 9 is a time chart illustrative of the manner in which the operation state of the switching devices 12-22 is switched or changed over by the instantaneous current value control using the second command currents iuc2, ivc2, iwc2. In FIG. 9, only the U-phase is illustrated for convenience of explanation. As shown in FIG. 9, at a control time t11, the actual current iu indicated by the thick solid line deviates upwards from a hysteresis region (defined between two thin solid lines) determined according to the second command current iuc2 indicated by the chain line. At the next control time t12, the actual current iu is inside the hysteresis region. Accordingly, at this stage, the drive pulse guc output from the hysteresis comparator 70 (FIG. 2) is not logically inverted yet. At the next subsequent control time t12, the actual current iu deviates downward from the hysteresis region. Thus, at this control time t13, the drive pulse guc of the hysteresis comparator 70 is logically inverted so that the operation state of the switching devices 12, 14 (FIG. 1) is switched from one state to the other. Since the actual switching timing RP lags behind the switching timing TP as required for the switching of the operation state of the switching devices 12, 14 to generate the desired torque, a difference, or error, exists between the actual output torque and the desired torque.

To avoid this problem, it may be considered that the width between an upper limit and a lower limit of the hysteresis region (hysteresis width) should preferably be reduced. However, narrowing the hysteresis width may cause another problem in that the actual switching timing RP leads the switching timing TP as required for the switching of the operation state of the switching devices 12, 14 to generate the desired torque. In this case, a difference, or error, also exists between the output torque and the desired torque.

In view of the foregoing, according to the first embodiment of the present invention, if at an intersection time or timing at which the first command currents iuc1, ivc1, iwc1 and the second command currents iuc2, ivc2, iwc2 cross each other, namely, at a switching timing at which the operation state of the switching devices is switched from one state to the other by the rectangular wave control to generate the desired torque, switching of the operation state of the switching devices by the instantaneous current value control has not taken place, the switching is forcibly conducted. To achieve such forced switching operation, according to this embodiment, there is provided a two-phase/three-phase conversion section 82 (FIG. 2), which when the second command values id2, iq2 are used, converts the first command values id1, iq1 into three-phase first command currents iuc1, ivc1, iwc1. Furthermore, at a switching timing calculating section 84, when the second command values id1, iq2 are used, an intersection time at which each of the first command currents iuc1, ivc1, iwc1 and a corresponding one of the second command currents iuc2, ivc2, iwc2 cross each other is calculated. Furthermore, in order to realize the switching of the operation state of the switching devices 12-22 at the intersection time, a necessary time Tu, Tv, Tw that elapses before the intersection time and operation state switching instruction signals Su, Sv, Sw are output from the switching timing calculating section 84 to the final switching signal determination section 80. Thus, the final switching signal determination section 80 performs switching of the operation state of the switching devices 12-22 based on the instruction signals Su, Sv, Sw if such switching by the instantaneous current value control has not taken place when the necessary time has elapsed.

Among those processes achieved by the switching timing calculating section 84, only a procedure pertaining to the calculation of the switching timing for the U-phase will be described with reference to a flowchart shown in FIG. 10. This procedure is repeatedly executed at predetermined intervals of time by the microcomputer 50. Processing procedures executed for the V-phase and W-phase are the same as the one shown in FIG. 10 and, hence, a description thereof can be omitted.

The procedure begins at a step S30, which determines whether the instantaneous current value control using the second command value id2, iq2 is now going on. In this instance, the determination is performed through a judgment made to determine as to whether the current command value switching section 64 (FIG. 2) outputs signals indicating that the second command values id2, iq2 have been selected. If the determination at the step S30 is affirmative (i.e., the second command values id2, iq2 have been selected), the next step S32 calculates a U-phase first command current iuc1 and an increment Δiuc1 thereof during the control period. In this instance, the U-phase first command current iuc1 can be calculated through a conversion made by the two-phase/three-phase converting section 82 from the first command values id1, iq1 on dq-axes (static coordinate system) into the first command currents iuc1, ivc1, iwc1 in the three-phase (rotating coordinate system). The increment Δiuc1 can be calculated by approximation using the first degree terms of Taylor's series, as explained below.

Two-phase/three-phase conversion from the dq-axis currents id, iq into three-phase currents iu, iv, iw (designated by the same reference characters as those used with the actual currents iu, iv, iw, this should be construed as illustrative but not restrictive) is performed in the following manner.

$$iu = \sqrt{2/3}\{\cos(w \times t) \times id - \sin(w \times t) \times iq\}$$

$$iv = \sqrt{2/3}\{\cos(w \times t - 2\pi/3) \times id - \sin(w \times t - 2\pi/3) \times iq\}$$

$$iw = \sqrt{2/3}\{\cos(w \times t + 2\pi/3) \times id - \sin(w \times t + 2\pi/3) \times iq\}$$

Temporal differentiation performed on both sides of each of the above equations would result in:

$$d(iu)/dt = w \times \sqrt{2/3}\{\cos(w \times t) \times (-iq) - \sin(w \times t) \times id\}$$

$$d(iv)/dt = w \times \sqrt{2/3}\{\cos(w \times t - 2\pi/3) \times (iq) - \sin(w \times t - 2\pi/3) \times id\}$$

$$d(iw)/dt = w \times \sqrt{2/3}\{\cos(w \times t) \times (-iq) - \sin(w \times t + 2\pi/3) \times id\}$$

Figure 11:
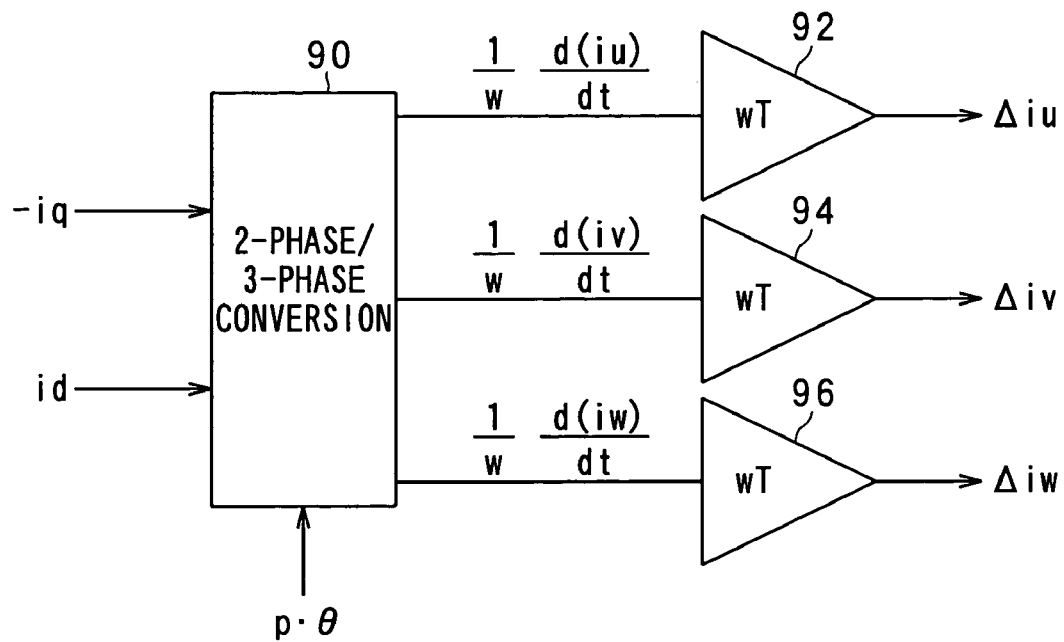
FIG. 11 is a block diagram showing an estimating process to estimate an increment of each command current before the next control time according to the first embodiment of the present invention.

As understood from the forgoing equations, the temporal differentiation can be performed by setting current vectors (−iq, id) as a conversion object in place of the current vector (id, iq) used as a conversion object in the two-phase/three-phase conversion. FIG. 11 shows a calculation technique used for calculating increments Δiuc1, Δivc1, Δiwc1 of the respective first command currents iuc1, ivc1, iwc1 and of the respective second command currents iuc2, ivc2, iwc2 described later. As shown in FIG. 11, the current vectors (−iq, id) are subjected to a phase conversion process at a two-phase/three-phase conversion section 90, and the outputs from the two-phase/three-phase conversion section 90 are then subjected to a multiplying process at multipliers 90, 94, 96 where each of the outputs is multiplied by the product of an electrical angular velocity w multiplied by a control period T with the result that increments Δiuc1, Δivc1, Δiwc1 are obtained.

Figure 10:
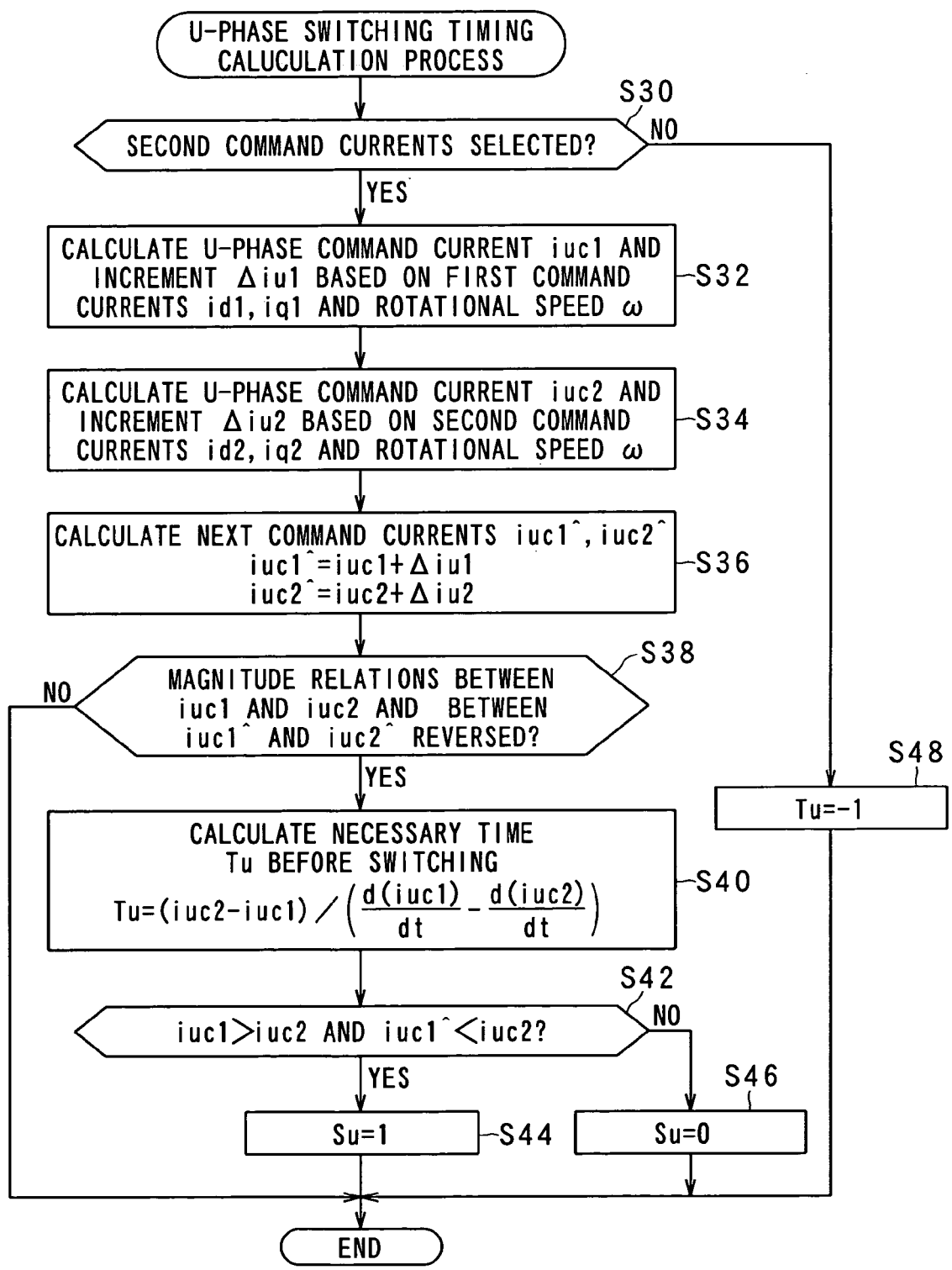
FIG. 10 is a flowchart showing a procedure for a switching timing calculation process according to the first embodiment of the present invention.

Step 32 shown in FIG. 10 is thus completed. At the next following step S34, a U-phase second command current iuc2 and an increment Δiuc2 during the control period are calculated. In this instance, calculation of the U-phase second command current iuc2 is conducted by the two-phase/three-phase conversion section 66 shown in FIG. 2, and calculation of the increment Δiuc2 is performed by using the technique shown just described above with reference to FIG. 11.

Figure 12:
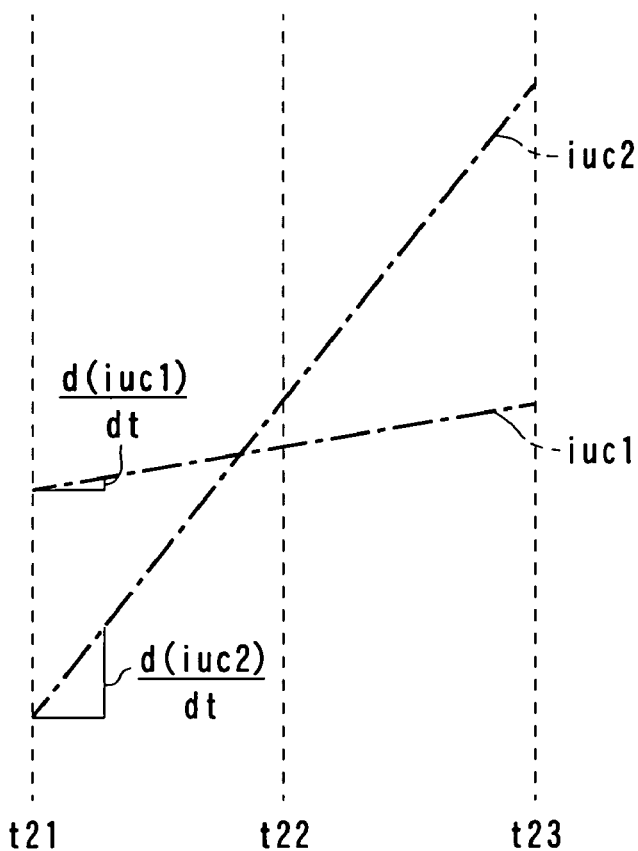
FIG. 12 is a time chart showing a determination technique to determine whether the first command current and the second command current cross each other according to the first embodiment of the invention.

The procedure shown in FIG. 10 further advances to step S36 where an estimated value iuc1^ of the next first command current and an estimated value iuc2^ of the next second command current are calculated. In this instance, the increment Δiuc1 is added to the current first command current iuc1 to thereby calculate an estimated value iuc1^ of the next first command current, and the increment Δiuc2 is added to the current second command current iuc2 to thereby calculate an estimated value iuc2^ of the next second command current. Step S36 is followed by step S38, which determines whether a magnitude relation between the estimated value iuc1^ and the estimated value iuc2^ is opposite to the magnitude relation established between the current first command value iuc1 and the current second command current iuc2. This process makes it possible to determine whether the first command current iuc1 and the second command current iuc2 will cross each other before the next control time. As shown in FIG. 12, if the first command current iuc1 and the second command current iuc2 cross each other at a time point t22 located between the current control time t21 and the next control time t23, reversing of the magnitude relation will occur. Thus, the likelihood of occurrence of a current crossing or intersection can be determined based on the reversing of the magnitude relation.

If the determination by step S38 indicates that the reversing of the magnitude relation will take place, then the step S40 calculates a necessary time Tu that is a time duration between the current control time and the intersection time. In this instance, the necessary time Tu is calculated as the quotient of the difference between the second command current iuc2 and the current first command current iuc1 divided by the difference between a temporal derivative value of the first command current iuc1 and a temporal derivative value of the second command current iuc2.

Then, the procedure further advances to step S42, which determines whether the current first command value iuc1 is larger than the current second command current iuc2 and the estimated value iuc1^ of the first command current is smaller than the estimated value iuc2^ of the second command current iuc2. This process makes it possible to determine which one of the U-phase switching devices 12 and 14 is to be switched to the On-state. If the determination at step S42 is affirmative, then step S44 sets the instruction signal Su to 1 (one) level to thereby instruct a switching operation to realize that the switching device 12 is in the On-state and the switching device 14 is in the Off-state. Alternatively, if the determination at step S42 is negative, then step S46 sets the instruction signal Su to 0 (zero) level to thereby instruct a switching operation to realize that the switching device 12 is in the Off-state and the switching device 14 is in the On-state.

On the other hand, if the determination at the step S30 is negative (i.e., the second command values id2, iq2 have not been selected), the procedure is branched to step S48 where the necessary time Tu is set to −1. When the process at step S44, S46 or S48 is completed, the procedure is terminated.

FIGS. 13(*a*) and 13(*b*) are flowcharts showing in combination a procedure to execute a process relating to a U-phase switching control, which is selected from among those processes achieved by the final switching signal determination section 80. More particularly, the flowchart shown in FIG. 13(*a*) illustrates a U-phase switching control process achieved to follow the process shown in FIG. 10, and the flowchart shown in FIG. 13(*b*) illustrates an interruption process achieved at a time when a matched condition is detected by the agreement detection circuit 50*e* (FIG. 1). Processing procedures executed for the V-phase and W-phase are the same as those shown in FIGS. 13(*a*) and 13(*b*) and, hence, a description thereof can be omitted.

The procedure shown in FIG. 13(*a*) begins at step S50 where a judgment is made to determine whether the necessary time is greater than or equal to 0 (zero). This process makes it possible to determine whether a condition to give priority to a switching operation based on the instruction signal Su has been satisfied by the setting of the instruction signal Su and the necessary time Tu achieved through the process shown in FIG. 10. If the necessary time Tu is determined to be greater than or equal to 0 (zero), then the procedure advances to step S52 where the sum of the necessary time Tu and the current timed value of the timer 50*c* (FIG. 1) is set to the register 50*d*. This will ensure that at a lapse of the necessary time Tu, agreement or matching of the timed value on the timer 50*c* and the preset value on the register 50*d* is detected by the agreement detection circuit 50*e*. Upon detection of this matching, the interruption process shown in FIG. 13(*b*) is started to run. At first, step S64 the instruction signal Su is set in the output port 50*f*. The thus set instruction signal Su is forcibly output from the output port 50*f*. Accordingly, if logical inversion of the drive pulse guc by the instantaneous current value control has not take place, the operation state of the switching devices 12 and 14 is forcibly changed or switched from one state to the other. Then, step S66 sets an interruption history flag, indicating that the forced switching has been conducted according to the instruction signal Su.

Subsequently, step S54 shown in FIG. 13(*a*) determines whether the interruption history flag has been set. This process is performed for the purpose of determining whether a disabling process for disabling the drive pulse of the instantaneous current value control is to be achieved. The determination is based on the fact that forced switching of the operation state of the switching devices at a time when the first command current iuc1 and the second command current iuc2 cross each other can take place only when the instruction signal Su and the drive pulse guc constitute instruction signals contradictory to each other. Under such condition, if disabling of the drive pulse guc is not effected, this will allow the state of the switching devices to be changed again by the instantaneous current value control even through the switching state has been already changed at a time proper to the rectangular wave control.

Thus, when the determination at step S54 shows that the interruption history flag is ON, the procedure goes on to step S56 for the purpose of performing disabling of the drive pulse guc. Step S56 determines whether a count value of an occurrence counter, which counts the number of occurrences of the control time achieved after the occurrence of an interruption, is greater than or equal to a predetermined value γ. This process is performed to determine whether disabling of the drive pulse guc can be canceled or not. The predetermined value γ is set to a value, which is capable of disabling the drive pulse guc disabled over a period during which time respective instructions conveyed by the drive pulse guc and the instruction signal Su can be contradict to each other and, which is as small as possible. By thus setting the predetermined value γ, it is possible to prevent undue deviation of the actual current iu from the first command current iuc1. Stated in other words, by enabling the drive pulse guc as early as possible, it is possible to start current feedback control by the instantaneous current value control, which will control the actual current iu toward the first command current iuc1. In this embodiment, the disabling time period is much smaller than half cycle (2π/w) of the first command current iuc1. The disabling period is variable depending on the setting of the hysteresis width but it is set preferably in the range of 20 to 200 μs.

If the determination at step S56 shows that the count value of the occurrence counter is less than the predetermined value γ, then step S58 increments the occurrence counter. Alternatively, if the count value of the occurrence counter is greater than or equal to the predetermined value γ, then step S60 resets the interruption history flag and the occurrence counter.

On the other hand, when the determination at step S54 shows that the interruption history flag has not been set, then step S62 sets a drive pulse guc in the output port 50f (FIG. 1) to thereby enable the drive pulse guc. Thus, the drive pulse guc is enabled when the first command current iuc1 is used with the instantaneous current value control, and when the second command current iuc2 is used and the interruption history flag is reset.

Figure 13A:
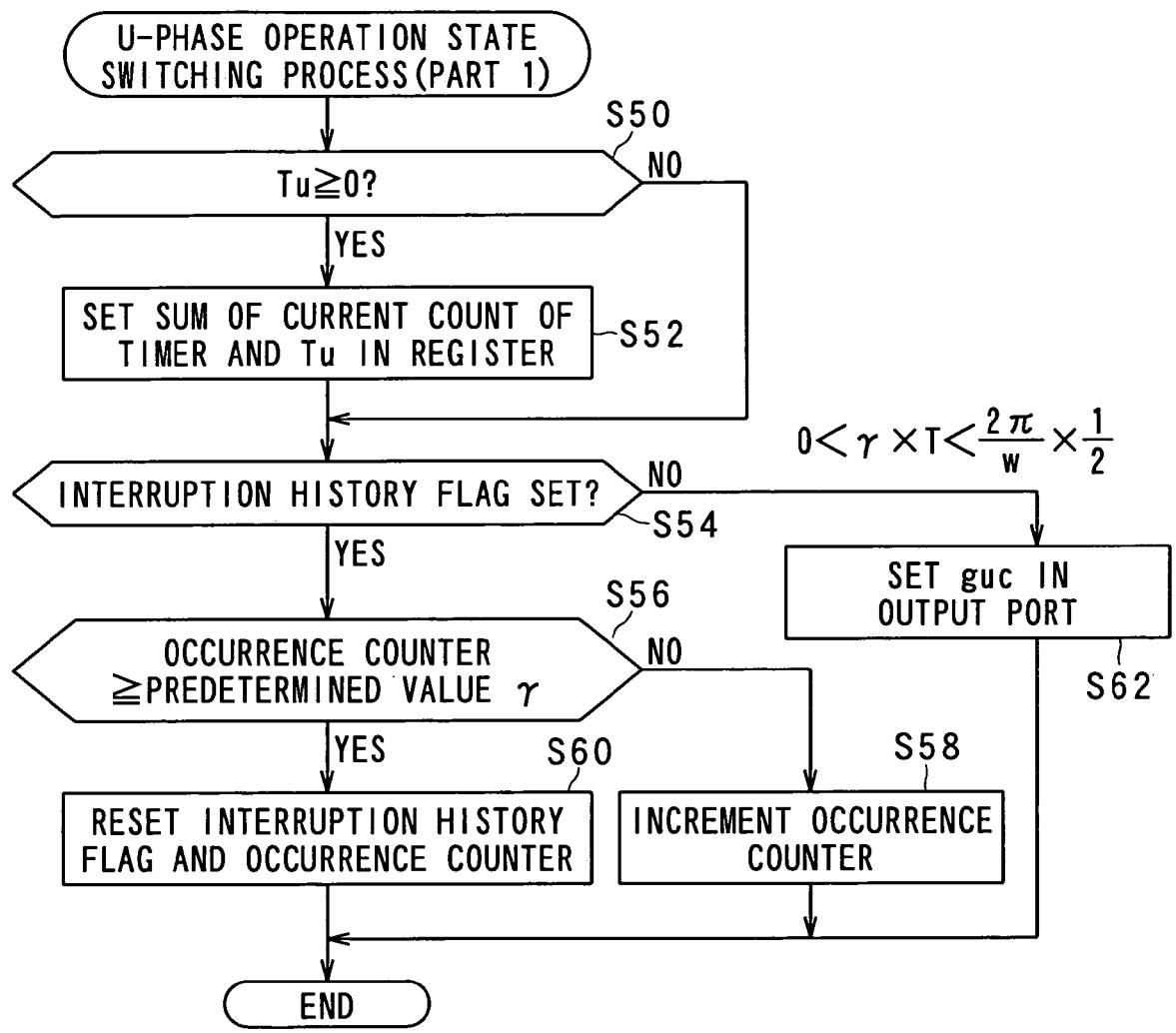
FIG. 13(a) is a flowchart showing a procedure to be executed to perform an operation state switching process according to the first embodiment of the present invention.

When the process at step S58, S60 or S62 is completed, the procedure shown in FIG. 13(a) is terminated.

Figure 14:
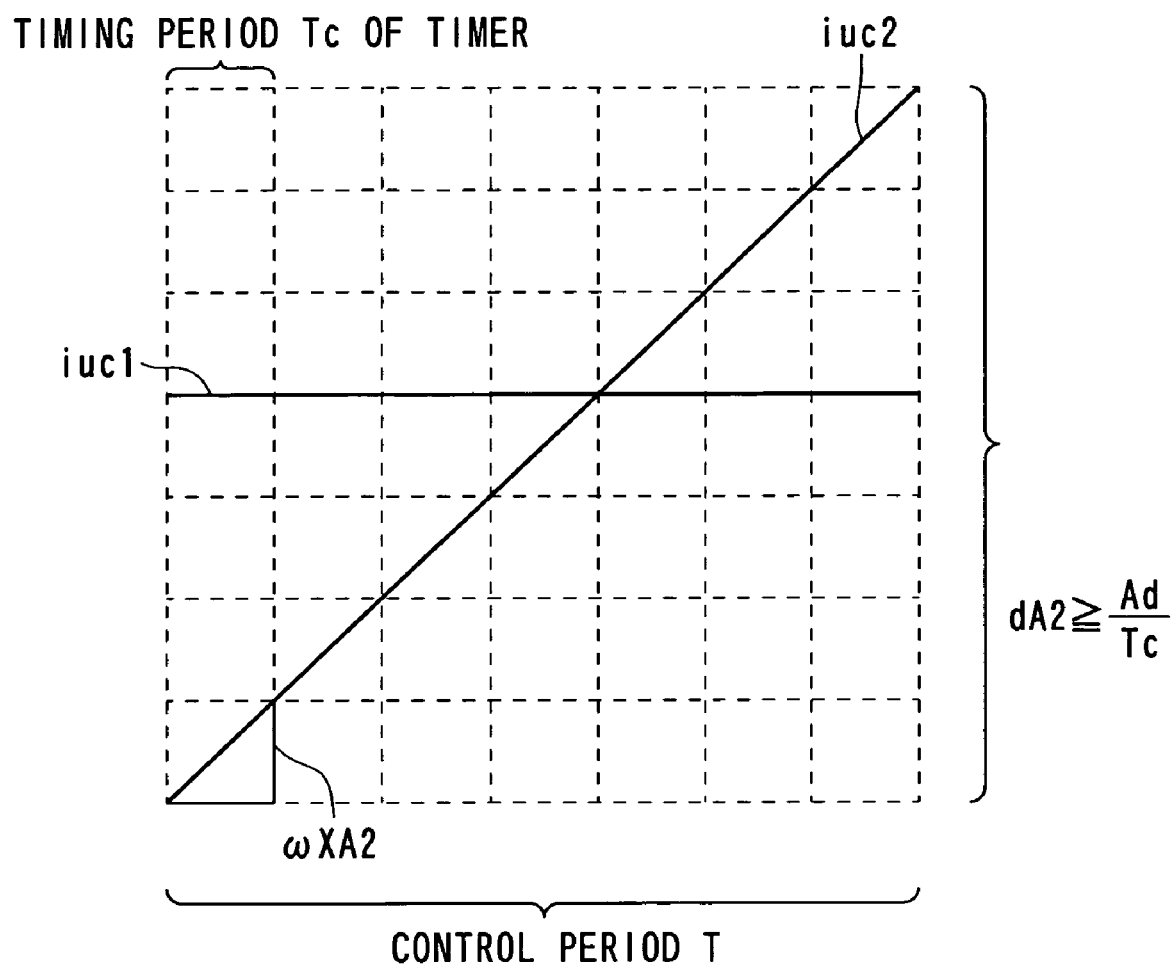
FIG. 14 is a graph illustrative of the manner in which the timing period of the timer and the minimum unit of the second command current are set according to the first embodiment of the present invention.

The amplitude A2 of the second command current iuc2 is set to be greater than or equal to $Ad/(\omega min \times Tc)$ where Tc is the timing period of the timer 50c, Ad is the minimum unit quantity of the second command current iuc2 involved in the digital processing thereof, and ωmin is the minimum electrical angular velocity when the second command current iuc2 is selected (which is the product of the prescribed rotational speed β in step S10 shown in FIG. 5 multiplied by the number of pairs of poles p). The reason for the aforesaid setting will be described below with reference to FIG. 14. As shown in FIG. 14, by the use of the time intervals between control times (control period T) and the timing period Tc of the timer, the number of timing operations performed during a single control period T can be expressed as: T/Tc. On the other hand, by using the minimum unit quantity Ad, the electrical angular velocity ω and the amplitude A2 of the second command current iuc2, the number of second command current increments performed during a single control period T can be expressed as: $\omega \times A2 \times T/Ad$. In this instance, the rate of change of the second command current iuc2 in the vicinity of the intersection between the first command current iuc1 and the second command current iuc2 can be approximated as: $\omega \times A2$. Assuming that changes or variations in the first command current iuc1 during the control period T are negligible, the intersection time at which the second command current iuc2 intersects the first command current iuc1 can be calculated with accuracy at least comparable to the accuracy of the timing operation provided that $\omega \times A2 \times T/Ad \geq T/Tc$. From this, we can obtain $A2 \geq Ad/(\omega \times Tc)$. As is apparent from the foregoing inequality, the right member increases as ω decreases. Thus, using the minimum electrical angular velocity ωmin at the time the second command current iuc2 is selected, required conditions for the amplitude A2 can be expressed as: $Ad/(\omega min \times Tc)$.

Figure 15:
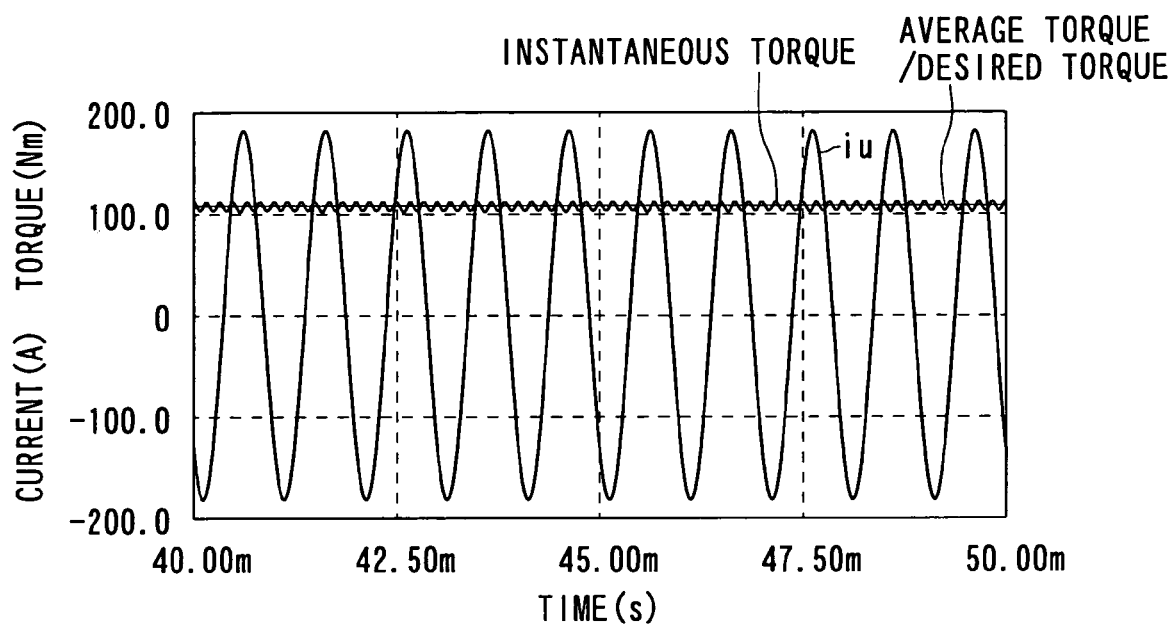
FIG. 15 is a time chart showing the result obtained from a simulation of output torque control according to the first embodiment of the invention.
Figure 16:
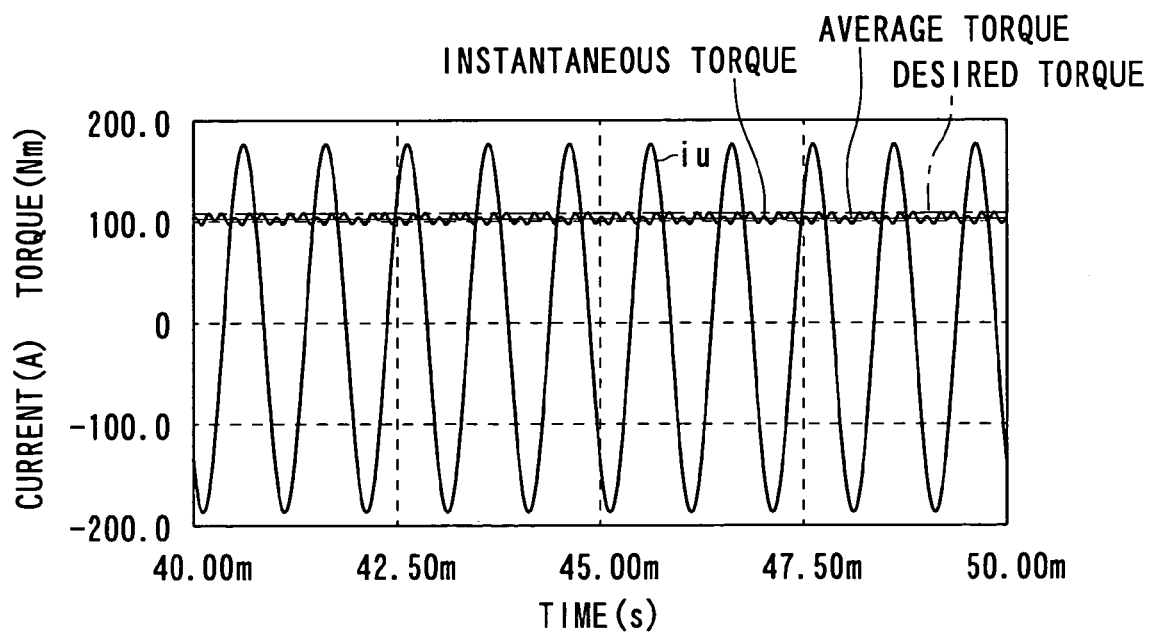
FIG. 16 is a time chart showing the result obtained from a simulation of output torque without the use of the forced switching process.

FIG. 15 shows the results of a torque control simulation performed according to the first embodiment of the present invention. As evidenced from FIG. 15, the average torque is in good conformance to the desired torque and is controlled toward the desired torque with high accuracy by the effect of the forced switching process achieved according to the instruction signal Su. By contrast, FIG. 16 shows the results of a torque control simulation, which was performed under the effect of the instantaneous current value control using the second command current iuc2 without involving the forced switching operation according to the instruction signal Su. As evidenced from FIG. 16, the instantaneous torque pulsates with a period approximately twice the period of the actual current iu, and the average torque deviates from the desired torque.

According to the first embodiment of the present invention, various advantageous effects can be achieved as enumerated below.

(1) At a time when each of the second command currents (large amplitude command currents) iuc2, ivc2, iwc2 intersects a corresponding one of the first command currents (required currents) iuc1, ivc1, iwc1, if switching of the operation state of the switching devices by the instantaneous current value control has not taken place, such switching is forcibly performed. By virtue of the forced switching, it is possible to allow the instantaneous current value control to play a part in the rectangular wave control and also to prevent the switching device operation state switching timing by the instantaneous current value control from lagging behind the switching device operation state switching time by the rectangular wave control.

(2) After the forced execution, switching of the operation state of the switching devices by the instantaneous current value control is inhibited for a predetermined period of time. With this arrangement, it is possible to preclude a hindrance to a favorable condition that has been established by the forced switching effected at a timing proper to generate the desired torque.

(3) Based on a change in the magnitude relation between the second command currents iuc2, ivc2, iwc2 and the first command currents iuc1, ivc1, iwc1 that may occur as for values at the current control time and values at the next control time, a judgment is made to determine whether the second command currents iuc2, ivc2, iwc2 and the first command currents iuc1, ivc1, iwc1 cross each other before the next control time. This will ensure that the likelihood of the occurrence of an intersection time can be properly determined before the next control time.

(4) The dq-axis command values id1, iq1, id2, iq2 are subjected to a conversion by the two-phase/three-phase conversion section 90 to execute temporal differentiation of the second command currents iuc2, ivc2, iwc2 and the first command currents iuc1, ivc1, iwc1 while, at the same time, estimated values of the second command currents iuc2, ivc2, iwc2 and the first command currents iuc1, ivc1, iwc1 at the next control time are calculated by the use of Taylor's series. By thus using the two-phase/three-phase conversion section 90, the Taylor's series can be calculated with ease, which will lead to easy estimation of the second command currents iuc2, ivc2, iwc2 and the first command currents iuc1 at the next control time.

(5) The second command currents iuc2, ivc2, iwc2 and the first command currents iuc1, ivc1, iwu1 at the next control time are calculated by approximation using only the first degree terms of Taylor's series. Thus, the second command currents iuc2, ivc2, iwc2 and the first command currents iuc1 at the next control time can be calculated through simpler processes.

(6) By the use of the timing period Tc of the timer 50c, the minimum unit quantity Ad of the second command current iuc2 involved in the digital processing thereof, and the minimum electrical angular velocity ωmin at a time the second command current iuc2 is selected (i.e., the rectangular wave control is performed), the amplitude A2 of the second command current iuc2 is set to be greater than or equal to Ad/(ωmin×Tc). With this setting, the intersection time at which the second command current iuc2 intersects the first command current iuc1 can be calculated with accuracy at least comparable to the accuracy of the timing operation.

(7) The necessary time Tu (which starts at the current control time and is ended at the intersection time) is calculated as the quotient of the difference between the second command current iuc2 and the first command current iuc1 divided by the difference between a temporal derivative value of the first command current iuc1 and a temporal derivative value of the second command current iuc2. The necessary time Tu (Tv, Tw) can thus be calculated easily.

(8) The amplitudes A2 of the second command currents iuc2, ivc2, iwc2 are set to be less than or equal to a value Amax obtained by the product of a maximum rated current value flowing in the inverter 10 multiplied by the square root of 2. With this amplitude setting, it is possible to keep the absolute value of the inverter current from exceeding the maximum rated current of the inverter 10.

(9) The second command currents iuc2, ivc2, iwc2 are adjusted so that each of the second command currents iuc2, ivc2, iwc2 intersects a corresponding one of the first command current iuc1, ivc1, iwc1 at a switching time at which the operation state of the switching devices 12-22 is switched to realize the desired torque by the rectangular wave control. This adjustment enables the instantaneous current value control to switch the operation state of the switching devices 12-22 at a time close to the intersection time.

Second Embodiment

A second preferred embodiment of the present invention will be described below in detail while focusing attention to the differences from the first embodiment.

Figure 17:
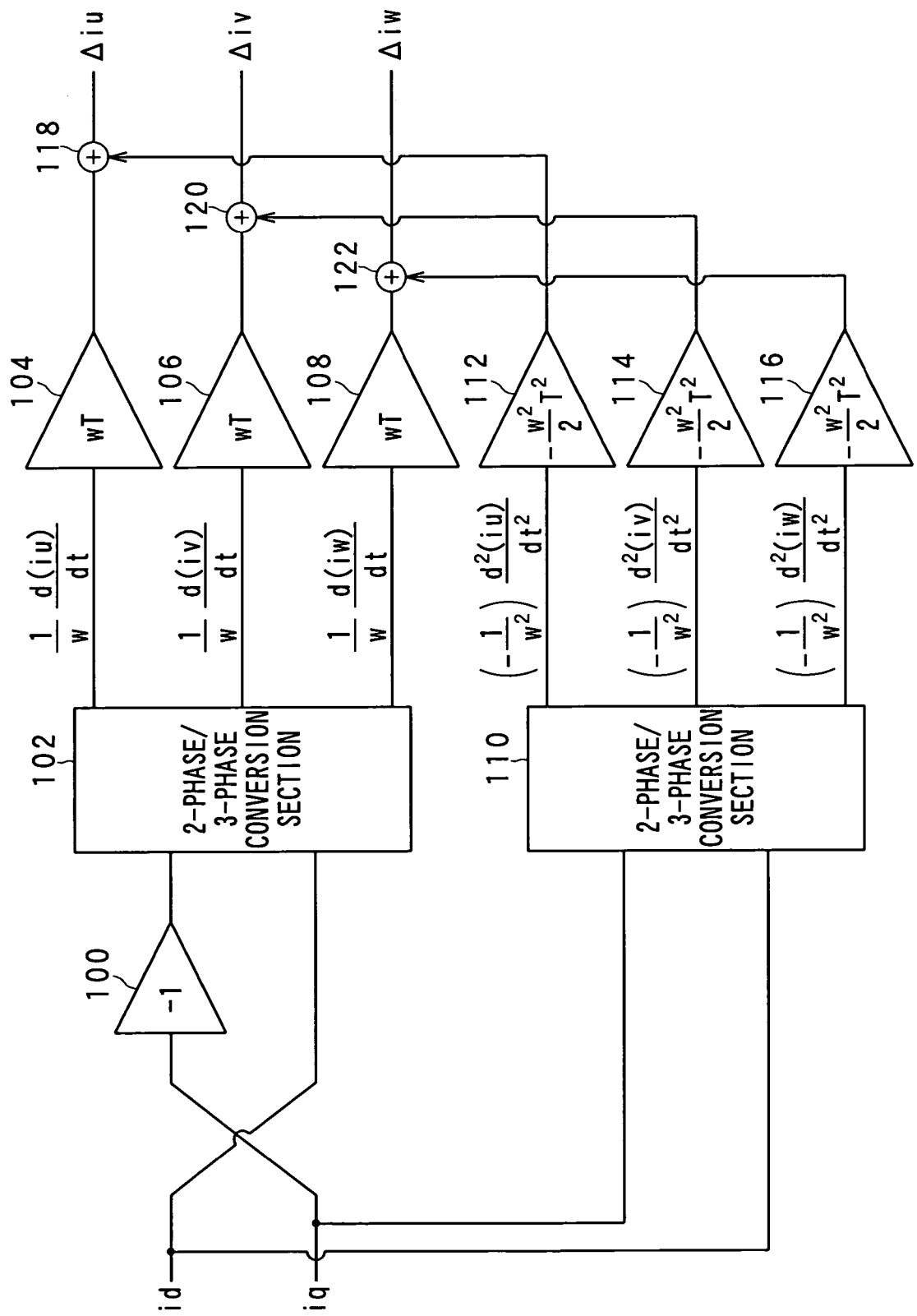
FIG. 17 is a block diagram showing an estimation process for estimating increments of the command current before the next control time according to a second preferred embodiment of the present invention.

In this embodiment, the second command currents iuc2, ivc2, iwc2 and the first command currents iuc1, ivc1, iwc1 at the next control time are calculated by approximation using up to the second degree terms of Taylor's series. It should be note that derivative values of the second order of these command currents can be obtained by subjecting the current vectors (id, iq) into two-phase/three-phase conversion and multiplied by −w×w. FIG. 17 shows a calculation process to obtain increments Δiuc2, Δivc2, Δiwc2 of the second command currents iuc2, ivc2, iwc2 and increments Δiuc1, Δivc1, Δiwc1 of the first command currents iuc1, ivc1, iwc1 according to the second embodiment of the present invention.

As shown in FIG. 17, a multiplier 100 reverses the sign of a q-axis component of the dq-axis current vectors (id, iq) and, thereafter, through component replacement it generates current vectors (−iq, id). The current vectors (−iq, id) are converted by a two-phase/three-phase converting section 102 into three-phase current vectors, which are then multiplied by wt at multipliers 104, 106, 108. The first degree terms of Taylor's series are thus calculated. On the other hand, the dq-axis current vectors (id, iq) are converted by a two-phase/three-phase converting section 110 into three-phase current vectors, which are then multiplied by (−½)w×w×T×T at multipliers 112, 114, 116. The second degree terms of Taylor's series are thus calculated. The first degree terms and the second degree terms are added together by adders 118, 120, 122 with the result that increments Δiuc2, Δivc2, Δiwc2 of the second command currents iuc2, ivc2, iwc2 and increments Δiuc1, Δivc1, Δiwc1 of the first command currents iuc1, ivc1, iwc1 are calculated.

According to the second embodiment just described above, in addition to the advantageous effects (1)-(4) and (6)-(9) as already achieved by the first embodiment, a further advantageous effect can be also achieved as enumerated below.

(10) The second command currents iuc2, ivc2, iwc2 and the first command currents iuc1, ivc1, iwc1 at the next control time are calculated by approximation using the second degree terms of Taylor's series. Such approximation ensures that the second command currents iuc2, ivc2, iwc2 and the first command currents iuc1, ivc1, iwc1 at the next control time can be calculated with higher accuracy.

Third Embodiment

A third preferred embodiment of the present invention will be described below in detail while focusing attention to the differences from the first embodiment.

Figure 18:
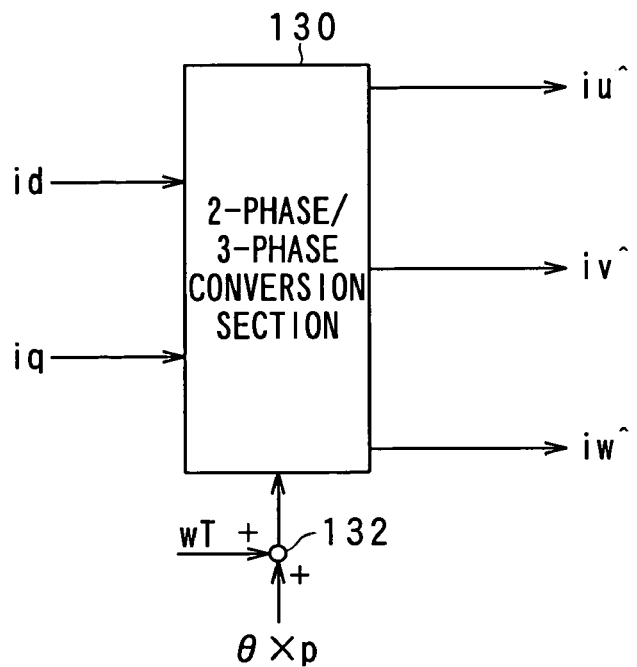
FIG. 18 is a block diagram showing an estimation process for estimating increments of the command current before the next control time according to a second preferred embodiment of the present invention.

FIG. 18 shows a calculation process for estimating the second command currents iuc2, ivc2, iwc2 and first command currents iuc1, ivc1, iwc1 at the next control time according to the third embodiment.

As shown in FIG. 18, the current vectors (id, iq) are converted by a two-phase/three-phase conversion section 130 into three-phase current vectors. In this instance, an electrical angle used for such phase conversion consists of an angle which is lead the current electrical angle θ×p by a phase angle wT corresponding to an angular distance from the current control time to the next control time. With this arrangement, it is possible to calculate estimated values iuc2^, ivc2^, iwc2^ of the second command currents at the next control time and estimated values iuc1^, ivc1^, iwc1^ of the first command currents at the next control time without the use of Taylor's series.

According to the third embodiment just described above, in addition to the advantageous effects (1)-(3) and (6)-(9) as already achieved by the first embodiment, a further advantageous effect can be also achieved as described below.

(11) By virtue of the two-phase/three-phase conversion performed with the use of an electric angle which is leading the current electrical angle θ×p by a phase angle wT corresponding to an angular distance from the current control time to the next control time, estimated values iuc2^, ivc2^, iwc2^ of the second command currents at the next control time and estimated values iuc1^, ivc1^, iwc1^ of the first command currents at the next control time can be easily calculated.

Fourth Embodiment

A fourth preferred embodiment of the present invention will be described below in detail while focusing attention to the differences from the first embodiment.

In the first embodiment, the linear approximation is used to estimate second command currents iuc2, ivc2, iwc2 and first command currents iuc1, ivc1, iwc1 at the next control time. In this instance, however, a problem may arise in that estimated values of the second command currents iuc2, ivc2, iwc2 and estimated values of the first command currents iuc1, ivc1, iwc1 at the next control time lag behind the corresponding true values. In this case, the change in operation state of the switching devices 12-22 will occur at a time which is offset from a switching time proper to generate the desired torque by the rectangular wave control. This problem will be discussed in further detail with reference to FIG. 19.

Figure 19:
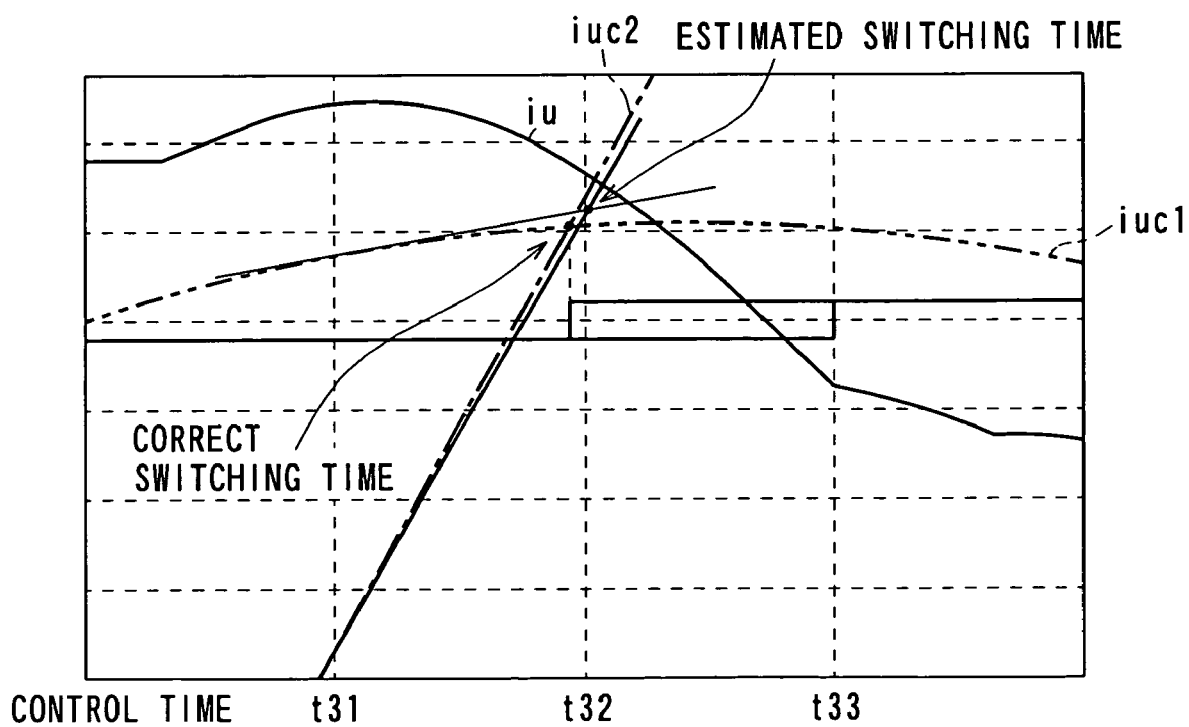
FIG. 19 is a time chart illustrative of the manner in which a process omission or skipping occurs in conjunction with a process of changing the operation process of the switching devices under the rectangular wave control.

As shown in FIG. 19, at a control time t31, the second command current iuc2 indicated by the chain line is smaller than the first command current iuc1 indicated by two-dot chain line. The estimated value of the second command current iuc2 at the next control time t32, which is estimated at the control time 31t through linear approximation, is also smaller than the estimated value of the first command current iuc1. Thus, the determination at step S38 shown in FIG. 10 indicates that the reversing of the magnitude relation will not take place and, accordingly, setting of the instruction signal Su does never take place. However, at the control time t32, the second command current iuc2 is larger than the first command current iuc1. Accordingly, if calculation is performed at this control time t32 to estimate an estimated value of the second command current iuc2 at the next control time t33 and an estimated value of the first command current iuc1 at the next control time t33, it will be determined that crossing of the second command current iuc2 and the first command current iuc1 does not take place before the next control time t33. This will cause an omission or skipping in the process of switching the operation state of the switching devices 12-22 under the rectangular wave control. Due to such process omission or skipping, the operation state of the switching devices 12-22 remains unchanged until the drive pulse guc of the instantaneous current value control causes a logic inversion. Thus, a delay or lag is produced in the switching operation.

To deal with this problem, the fourth embodiment is arranged such that if at every control time, the magnitude relation of the second command currents iuc2, ivc2, iwc2 and the first command currents iuc1, ivc1, iwc1 is reversed as for values at the preceding control time and the values at the current control time, and the change in operation state of the switching devices 12-22 has not taken place yet, then the operation state of the switching device 12-22 is forcibly changed at the current control time.

Figure 20:
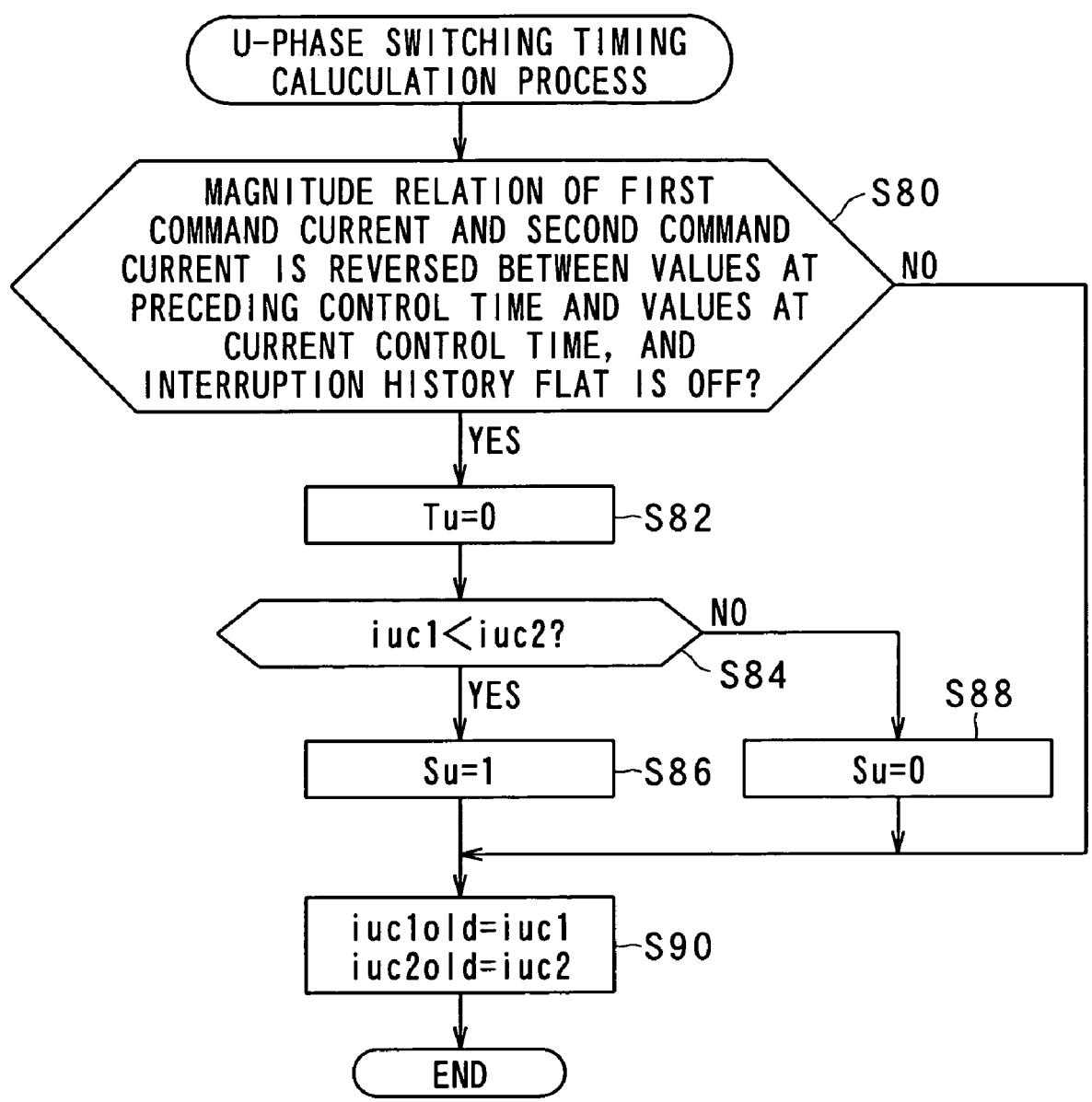
FIG. 20 is a flowchart showing a procedure to be executed to perform a switching timing calculating process according to a fourth embodiment of the present invention.

FIG. 20 is a flowchart showing a procedure to be achieved by the microcomputer 50 to perform a compensation process for compensating a process omission or skipping caused in connection with the operation to change the operation state of the switching devices 12, 14 in the U-phase.

As shown in FIG. 20, the procedure begins at step S80, which determines whether the magnitude relation between the first command current iuc1old and the second command current iuc2old at the preceding control time and the magnitude relation between the first command current iuc1 and the second command current iuc2 at the current control time are opposite or reversed to each other, and the interruption history flag is in the off-state. This process is performed to determine whether a process omission or skipping has occurs in conjunction with the switching or change in operation state of the switching devices 12, 14. If the determination result in step S80 is affirmative, then step 82 sets the necessary time Tu to be 0 (Tu=0) and the procedure goes on to step 84 where a judgment is made to determine whether the second command current iuc2 is larger than the first command current iuc1. This process is performed to set an operation state of the switching devices 12, 14 for the rectangular wave control. More particularly, if the judgment in step S84 is affirmative (i.e., iuc1<iuc2), then step S86 sets the instruction signal Su to logic 1 (one) level to thereby instruct a switching operation to realize a first switching state in which the switching device 12 is in the on-state and the switching device 14 is in the off-state. Alternatively, if the judgment in step S84 is negative (i.e., iuc1>iuc2), then step S88 sets the instruction signal Su to logic 0 (zero) level to thereby instruct a switching operation to realize a second switching state in which the switching device 12 is in the off-state and the switching device 14 is in the on-state. By thus setting the operation state of the switching devices 12, 14, the change in operation state of the switching devices 12, 14 by the instantaneous current value control has not been achieved yet, the operation state of the switching devices 12, 14 is forcibly changed through the process as already described with reference to FIGS. 13(a) and 13(b).

When the operations in step S86 and step S88 have completed, or when the determination result in step S80 is negative, then step 90 substitutes the first command current iuc1old at the preceding control time with the first command current icu1 at the current control time and also substitutes the second command current iuc2old at the preceding control time with the second command current iuc2 at the current control time. When the process in step 90 has completed, the procedure is terminated. Obviously, the foregoing procedure is also applied to the process performed with respect to the V-phase and W-phase, and description thereof can be omitted.

According to the fourth embodiment just described above, in addition to the advantageous effects (1)-(9) as already achieved by the first embodiment, a further advantageous effect can be also attained, as described below.

(12) If the magnitude relation between the second command currents iuc2, ivc2, iwc2 and the first command currents iuc1, ivc1, iwc1 is reversed as for their values taken at the preceding control time and values at the current control time, and the operation state of the switching devices 12-22 has not changed throughout a period between the preceding control time and the current control time, forced change in operating state of the switching devices is conducted at the current control time. With the forced change in operation state of the switching devices thus conducted, it is possible to preclude the occurrence of a lag between a switching timing proper to generate the desired torque under the rectangular wave control and the actual switching timing.

Fifth Embodiment

A fifth preferred embodiment of the present invention will be described below in detail while focusing attention to the differences from the first embodiment.

Figure 21:
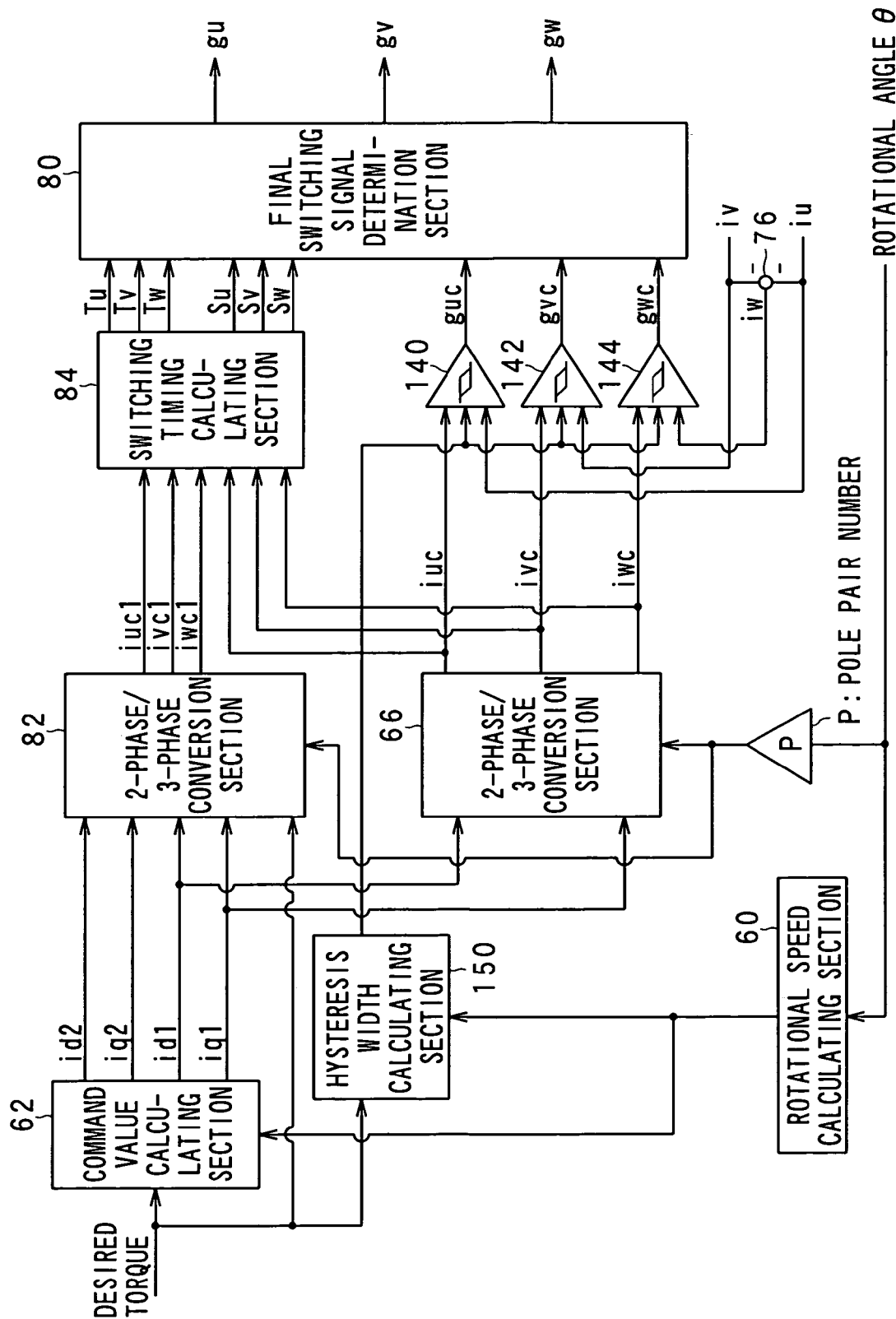
FIG. 21 is a functional block diagram showing various operations to be performed by the microcomputer according to a fifth embodiment of the invention.

FIG. 21 is a functional block diagram showing functional sections of the microcomputer 50 for performing a process pertaining to the generation of operation signals used for operating the switching devices 12-22. In FIG. 21, these functional parts which are corresponding to those already shown in FIG. 2 are designated by the same reference characters.

Figure 22:
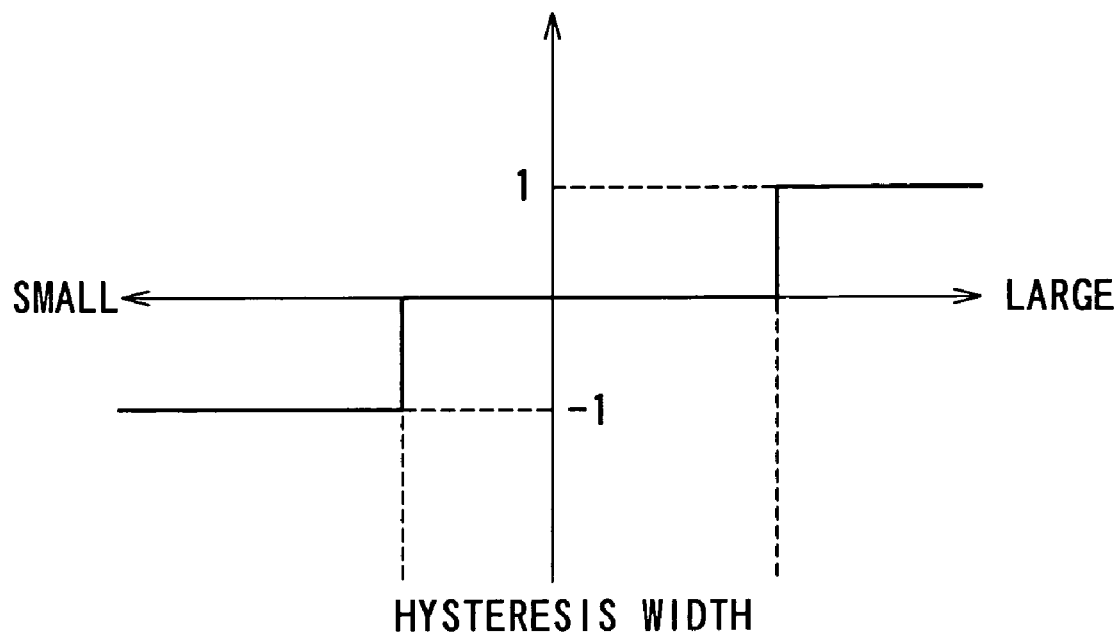
FIG. 22 is a graph showing an output characteristic of hysteresis comparators according to the fifth embodiment of the present invention.

In the embodiment shown in FIG. 21, first command values id1, iq1 corresponding to a required current are converted by a two-phase/three/phase converter 66 into command currents iuc, ivc, iwc for used in an instantaneous current value control process. In other words, regardless of the magnitudes of rotational speed and torque, the instantaneous current value control is performed by using the first command currents iuc, ivc, iwc. In this embodiment, however, hysteresis comparators 140, 142 and 144 are configured to output a signal, which is able to have three different logic values, as shown in FIG. 22. The output signal has a value of logic −1 when the actual current is smaller than a lower limit of the hysteresis region which is defined by a center value (first command currents iuc1, ivc1, iwc1). When the actual current is contained in the hysteresis region, the output signal takes a value of logic 0. And, when the actual current is larger than an upper limit of the hysteresis region, the output signal takes a value of logic 1.

When outputs of the hysteresis comparators 140, 142, 144 are logic 0, the operation state of the switching devices 12-22

(FIG. 1) is changed from one state to the other by using necessary times Tu, Tv, Tw and instruction signals Su, Sv, Sw that are calculated by a switching timing calculating section 84. Alternatively, if the outputs of the hysteresis comparators 140, 142, 144 are not logic 0, this means that the actual currents iu, iv, iw deviate from the associated hysteresis regions. Accordingly, the operation state of the switching devices 12-22 is forcibly changed by instantaneous current value control.

Figure 23:
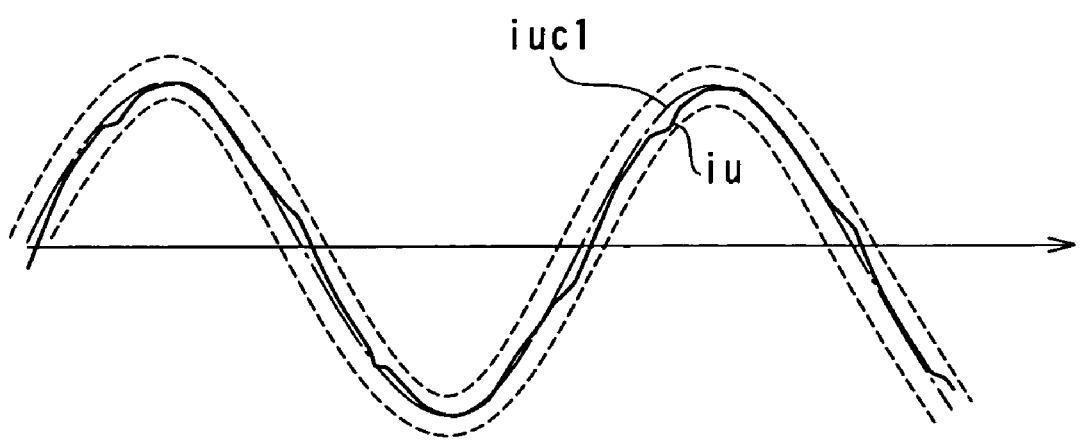
FIG. 23 is a time chart illustrative of the manner in which a hysteresis width is set in accordance with the fifth embodiment of the invention.

As shown in FIG. 23, the hysteresis width is determined such that when the rectangular wave control is normally performed, the change in operation state of the switching devices 12-24 by the instantaneous current value control does never take place. In practice, setting of the hysteresis width can be done on the basis of a value that can be assumed as the difference between the first command currents iuc1, ivc1, iwc1 and the actual currents iu, iv, iw at a time immediately before the change in operation state of the switching devices 12-22 caused during the rectangular wave control. This is because the difference between the first command currents iuc1, ivc1, iwc1 and the actual currents iu, iv, iw is the largest immediately before the operation state of the switching devices 12-22 is changed from one state to the other. In practice, in view of the effect of individual variability of the motor 2, variations between the current sensors 54, 56, and noises, the margin is added to the assumable value to thereby determine a hysteresis width.

Figure 24:
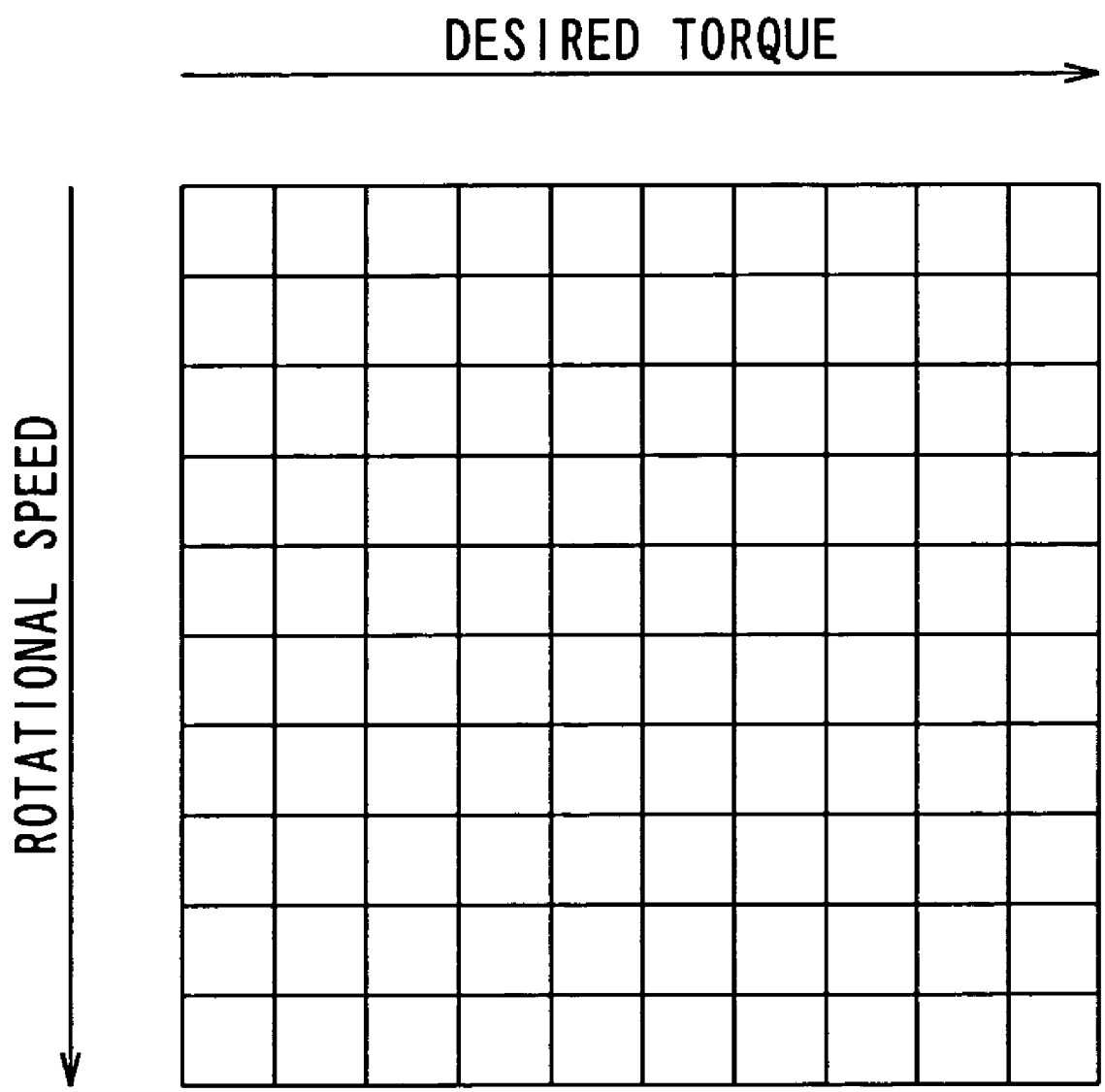
FIG. 24 is a view showing a table map used for setting the hysteresis width according to the fifth embodiment of the present invention.

In this embodiment, the hysteresis with is variably set according to the rotational speed and the desired torque of the motor 2. To this end, a hysteresis width calculating section 150 is provided, as shown in FIG. 21. The hysteresis width calculating section 150 is configured to variably set respective hysteresis widths of the hysteresis comparators 140, 142, 144 in accordance with the rotational speed and the desired torque of the motor 2. In the hysteresis width calculation section 150, a table map shown in FIG. 24 is used so that the hysteresis widths of the hysteresis comparators 140, 142, 144 are variably set. The table map is adjusted in advance by experiments or simulation so that the actual currents iu, iv, iw do not deviate from the corresponding hysteresis regions as long as the rectangular wave control is normally performed.

Figure 13B:
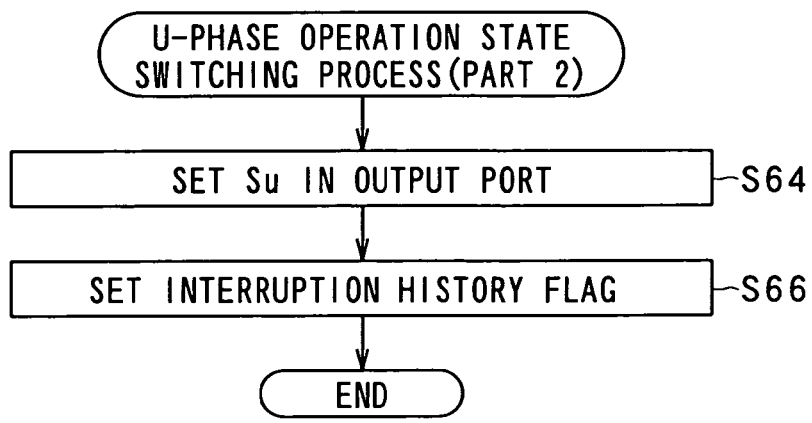
FIG. 13(b) is a flowchart showing a procedure to be executed to perform an interruption process according to the first embodiment of the invention.
Figure 25A:
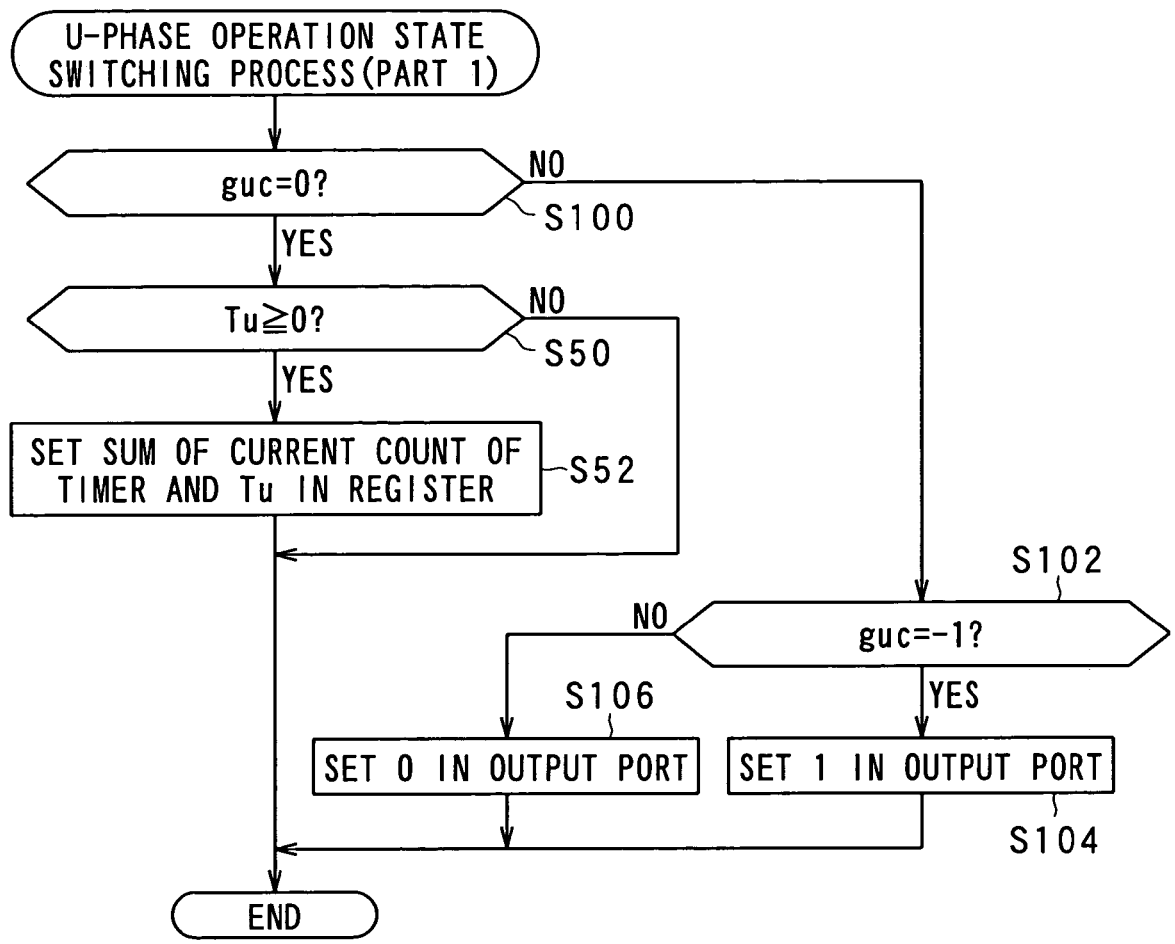
FIG. 25(a) is a flowchart showing a procedure to be executed to perform an operation state switching process according to the fifth embodiment of the present invention.
Figure 25B:
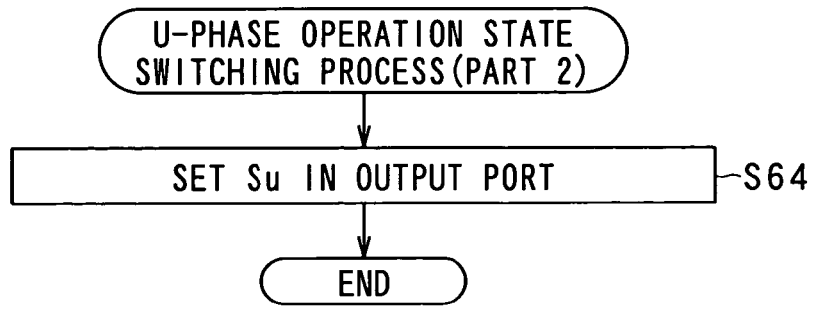
FIG. 25(b) is a flowchart showing a procedure to be executed to perform an interruption process according to the fifth embodiment of the invention.

FIGS. 25(a) and 25(b) are flowcharts showing in combination a procedure to execute a process relating to a U-phase switching control, which is selected from among those processes achieved by the final switching signal determination section 80. More particularly, the flowchart shown in FIG. 25(a) illustrates a U-phase switching control process achieved to follow the process shown in FIG. 10, and the flowchart shown in FIG. 25(b) illustrates an interruption process achieved at a time when a matched condition is detected by the agreement detection circuit 50e (FIG. 1). In FIGS. 25(a) and 25(b), these processing steps which are corresponding to those shown in FIGS. 13(a) and 13(b) are designated by the same step numbers. Processing procedures executed for the V-phase and W-phase are the same as those shown in FIGS. 25(a) and 25(b) and, hence, a description thereof can be omitted.

The procedure shown in FIG. 25(a) begins at step S100 where a judgment is made to determine whether the drive pulse guc output from the hysteresis comparator 140 is logic 1 or not. This process is performed to determine whether the actual current iu is contained in the hysteresis region. If the judgment in step S100 is affirmative, then step S50 determines whether or not the necessary time is greater than or equal to 0 (zero). If the determination result in step S50 is affirmative, then step S52 is performed in the manner as already discussed with reference to FIG. 13(a) and, thereafter, the procedure is terminated. Alternatively, if the determination in step S100 shows that the drive pulse guc output from the hysteresis comparator 140 is not logic 0, the switching devices 12 and 14 are operated according to the drive pulse guc. More particularly, when step S102 determines the drive pulse guc to be logic −1, step S104 sets logic 1 in the output port 50f (FIG. 1). Thus, the operation state of the switching devices 12, 14 is changed to realize a state where the switching device 12 is in on-state and the switching device 14 is in the off-state. Alternatively, if step S102 determines the drive pulse guc to be logic 1, step S106 sets logic 0 in the output port 50f (FIG. 1). Thus, the operation state of the switching devices 12, 14 is changed to a state where the switching device 12 is in off-state and the switching device 14 is in the on-state.

Figure 26:
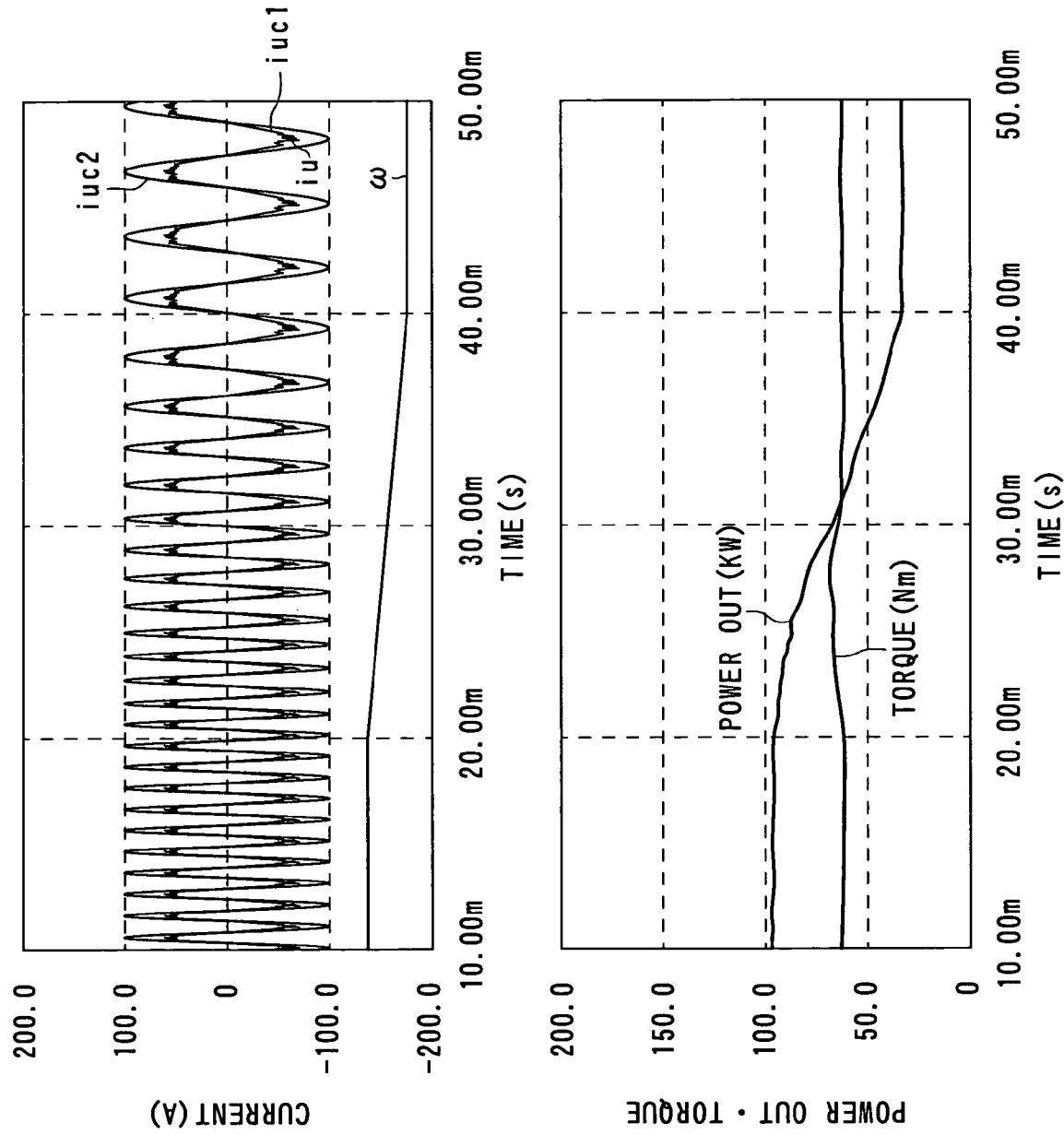
FIG. 26 is a time chart showing in combination the result obtained from a simulation of output torque control according to the fifth embodiment of the invention.
Figure 27:
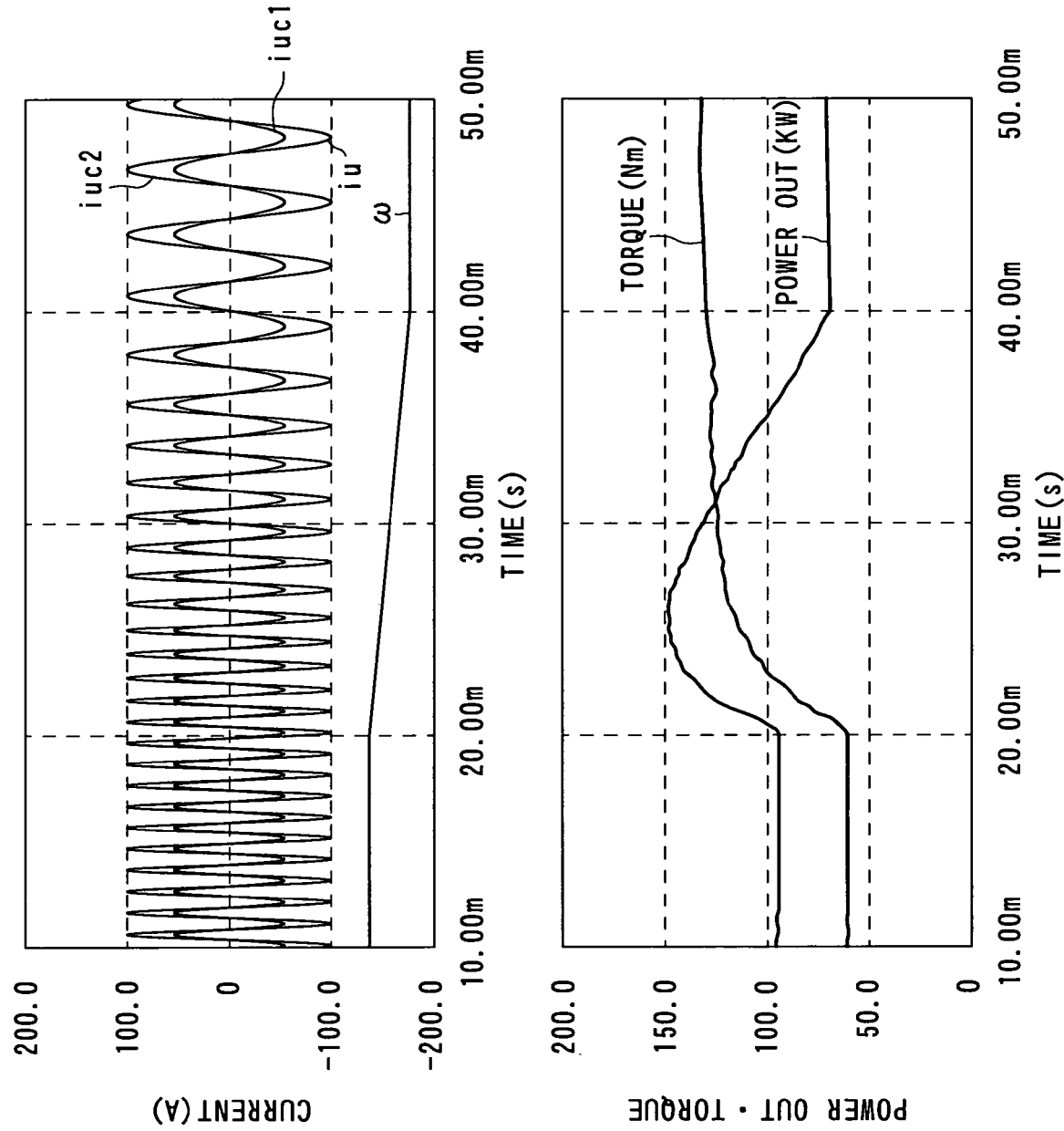
FIG. 27 is a time chart showing the result obtained from a simulation of output torque according to the first embodiment of the present invention.

FIG. 26 is a time chart illustrative of the manner in which output torque is controlled during transition in which rotational speed of the motor decreased. More specifically, FIG. 26 shows the result obtained from a simulation performed to observe the current and torque when the rotational speed ω of the motor 2 is changed to decrease from 15,000 rpm to 5,000 rpm at a rate of 500 rpm/ms. As evidenced from FIG. 26, the actual current iu indicated by the solid line exhibits good follow-up or tracking capability relative to the first command current iuc1 indicated by the two-dot chain line, and the torque is substantially free from fluctuation even in a transition time. FIG. 27 shows the simulation result which is performed under the same condition as that performed with the fifth embodiment but in conjunction with the first embodiment of the present invention. As shown in FIG. 27, during a transition time, the actual current iu follows the second command current iuc2, and accordingly the torque shows a noticeable increase. In this instance, however, thanks to an increase in the motor torque, the change in motor power (the product of rotational speed multiplied by torque) during the transition time is limitative as compared to that of the fifth embodiment of the present invention.

Figure 28:
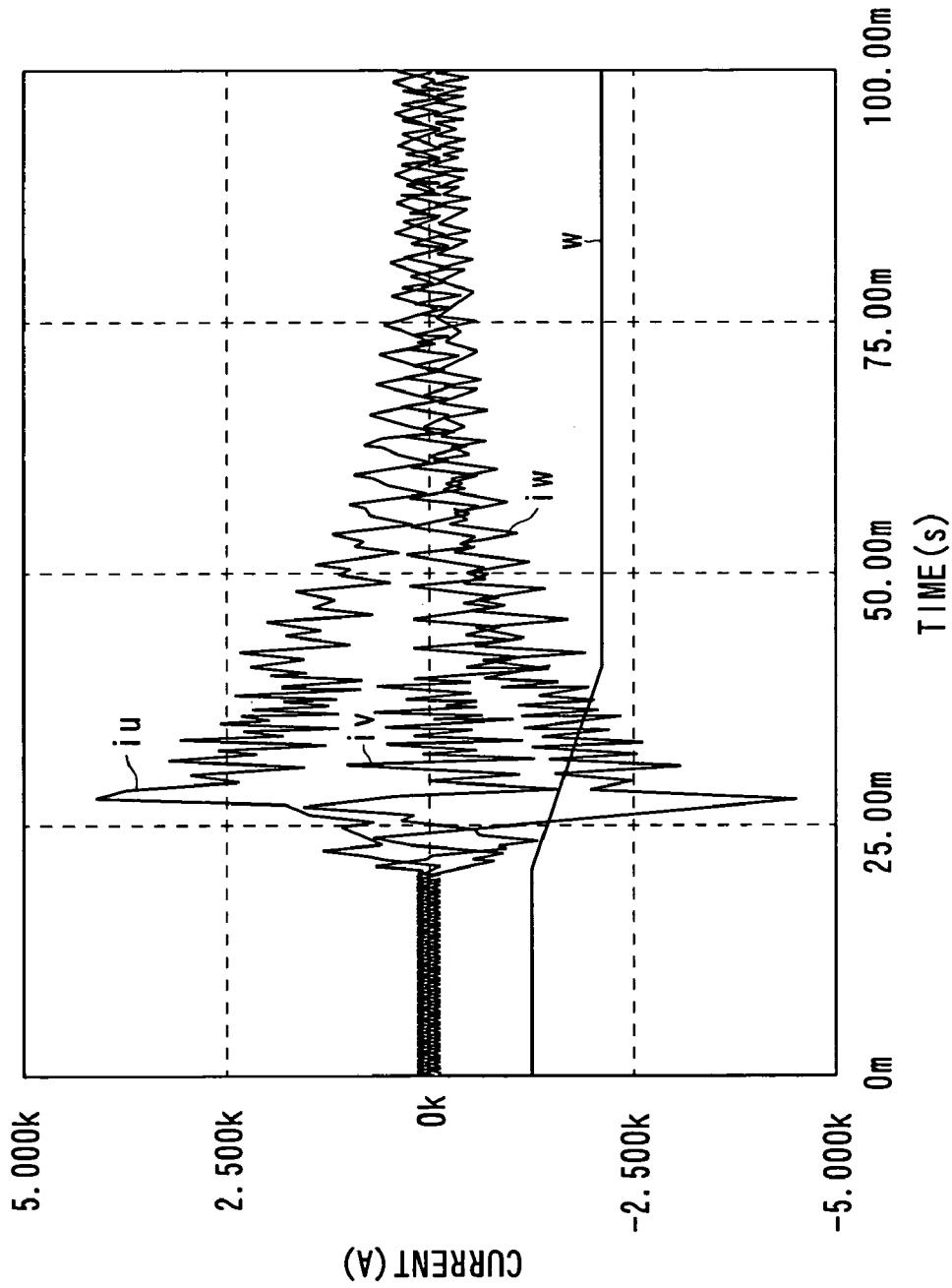
FIG. 28 is a time chart showing the result obtained from a simulation of current fluctuation caused during a transition period when a conventional rectangular wave control process is performed.

For comparative purposes, FIG. 28 shows the result obtained from a simulation performed under the same transitional conditions using a conventional rectangular wave control process. As shown in FIG. 28, current flowing through the switching devices is excessively increased. This will lower the reliability in operation of the switching devices.

According to the fifth embodiment just described above, in addition to the advantageous effects (1) and (3)-(7) as already achieved by the first embodiment, still further advantageous effects can be also attained, as enumerated below.

(13) The hysteresis comparators 140, 142, 144 are able to output three distinct logic values representing, respectively, a first condition in which the actual current is larger than the upper limit of the hysteresis region, a second condition in which the actual current is contained in the hysteresis region, and a third condition in which the actual current is smaller than the lower limit of the hysteresis region. By using outputs from the hysteresis comparators 140, 142, 144, the actual currents iu, iv, iw are properly feedback-controlled toward the corresponding first command signals iuc1, ivc1, iwc1 while the rectangular wave control is performed.

(14) The hysteresis region is variably set according to the rotational speed and the desired torque of the motor. With this arrangement, the actual currents are able to follow or track the first command currents as close as possible without posing any hindrance to the progress of the rectangular wave control when the rectangular wave control is normally performed.

(15) The hysteresis width is set such that the actually current does never deviate from the hysteresis region as tong as the rectangular wave control is normally performed.

Sixth Embodiment

A sixth preferred embodiment of the present invention will be described below in detail while focusing attention to the differences from the fifth embodiment.

Figure 29:
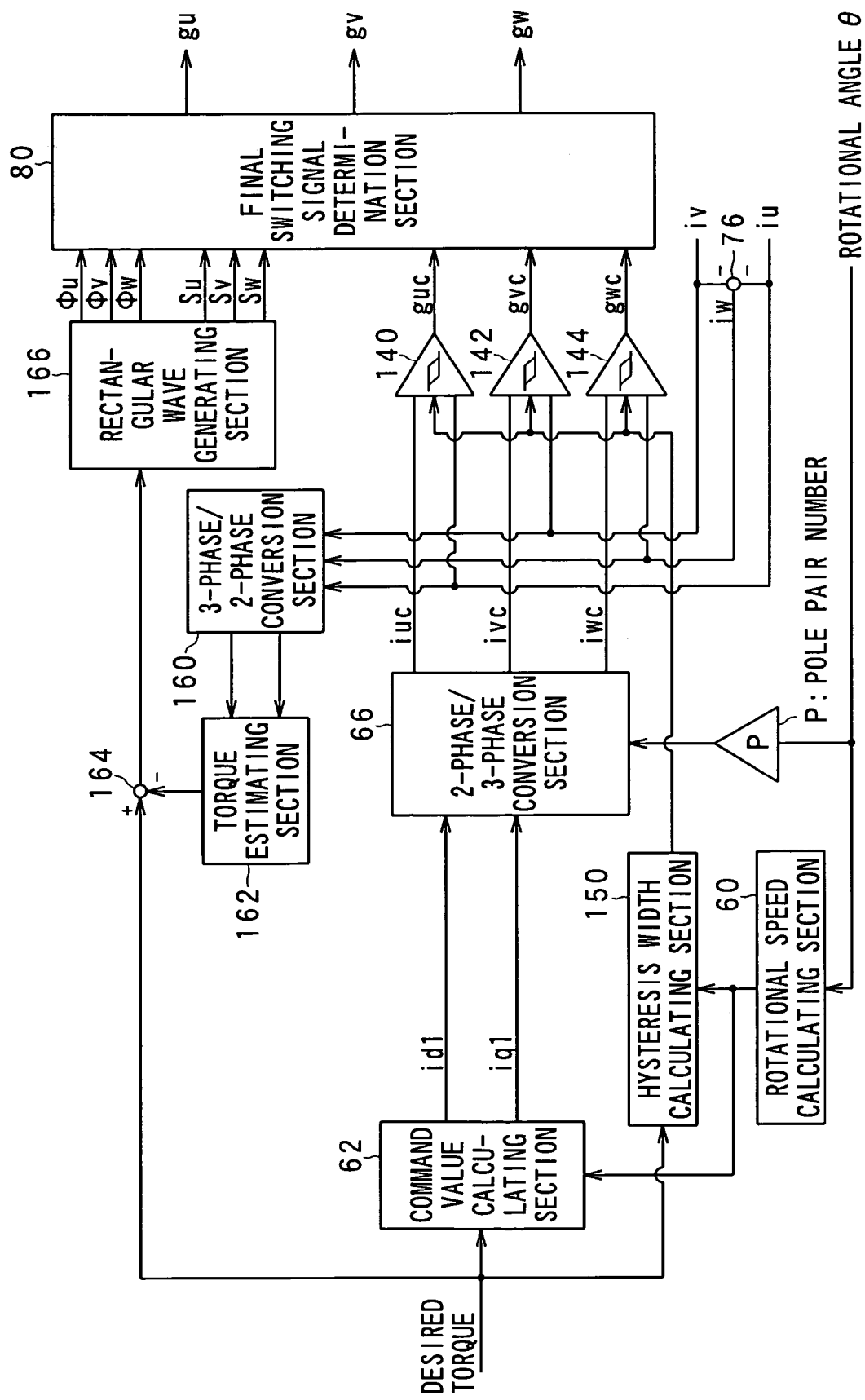
FIG. 29 is a functional block diagram showing various operations to be performed by the microcomputer according to a sixth embodiment of the invention.

FIG. 29 is a functional block diagram showing functional sections of the microcomputer 50 for performing a process pertaining to the generation of operation signals used for operating the switching devices 12-22. In FIG. 29, these functional parts which are corresponding to those already shown in FIG. 21 are designated by the same reference characters for convenience of illustration.

As shown in FIG. 29, the sixth embodiment is provided with a three-phase/two-phase converter 160. The actual current iu, iv, iw are converted by the three-phase/two-phase converter 160 into dq-axis actual currents, which are then supplied to a torque estimating section 162. The torque estimating section 162 estimates an output torque of the motor 2 on the basis of the dq-axis actual currents. The estimated output torque is fed to a deviation calculating section 164 where an offset or deviation of the estimated torque from the desired torque is calculated. The thus calculated offset or deviation is fed to a rectangular wave generating section 166. Based on the output from the deviation calculating section 164, the rectangular wave generating section 166 sets switching times (phases φu, φv, φw) and instruction signals Su, Sv, Sw that are proper to change the operation state of the switching devices 12-22 to thereby generate the desired torque by the rectangular wave control. The phases φu, φv, φw are determined in advance by experiment or simulation in the same manner as those done with the step S20 shown in FIG. 6.

The sixth embodiment is able to achieve the same advantageous effects as the fifth embodiment. More particularly, according to the sixth embodiment, the rectangular wave control is completely free from process omission or skipping and hence can be performed high accuracy.

Other Embodiments

The foregoing embodiments can be modified as follows:

The second, third and fifth embodiments may incorporate the compensation process (FIG. 20) for compensating a process omission or skipping.

In the fourth and fifth embodiments, the first and second command currents at the next control time may be calculation by using the process of the second and third embodiments.

The setting of a hysteresis width in the fifth and sixth embodiments should by no means be limited to adaptation or adjustment made by experiment or simulation. For instance, the hysteresis width may be set based on a maximum value of the difference between the actual current and the command current that is found out through calculation made by analytically solving differential equations about current and voltage.

In the second embodiment, the method of calculating the necessary time that elapses before an intersection time at which the first command current and the second command current cross each other should by no means be limited to the method used in the first embodiment. In the second embodiment, the first command current and the second command current at the next control time are approximated by using first and second degree terms of Taylor's series. In view of this, it may be possible to use second order derivatives of the first and second currents to calculate the necessary time.

In the illustrated embodiments, the invention is applied to a three-phase motor as a rotating machinery. The invention should by no means be limited to the illustrated embodiments but may be applied to a three-phase generator. In this case, a motor 2 operating with high output torque can be regarded as a generator operating with heavy load torque.

In the illustrated embodiments, the rectangular wave control and the instantaneous current value control are used in combination to control switching operation of the inverter 10. In a low-speed, small-torque operation range of the motor 2, the PWM control using a triangular wave as a carrier wave may be employed.

The rotating machinery controller according to the present invention may be installed not only on hybrid cars but also on electric cars. Furthermore, control process may be implemented in hardware devices such as a field-programmable gate array dedicated LSI, etc., in place of the microcomputer.

Obviously, various minor changes and modifications are possible in the light of the above teaching. It is to be understood that within the scope of the appended claims the present invention may be practiced otherwise than as specifically described.

What is claimed is:

1. A rotating machinery controller for controlling a rotation-related physical quantity of a rotating machinery by operating switching devices of an inverter to supply electric power to the rotating machinery, the rotating machinery controller comprising:

rectangular wave control means for controlling an output torque of the rotating machinery toward a desired torque by operating the switching devices such that an on-state and an off-state occur one time for one cycle period in electrical angle of the rotating machinery;

instantaneous current value control means for, in order to control an actual current of the rotating machinery within a predetermined hysteresis region which is determined by a command current to the rotating machinery, operating the switching devices on the basis of a magnitude relation between upper and lower limits of the hysteresis region and the actual current; and switching means for, when a current flowing through the rotating machinery deviates from the hysteresis region while the control by the rectangular wave control means is undertaken, switching the control by the rectangular wave control means to the control by the instantaneous current value control means.

2. The rotating machinery controller according to claim 1, wherein the rectangular wave control means comprises:

means for setting the command current of the instantaneous current control means to be a large-amplitude command current which is the same in period as, and larger in amplitude than, a current required to generate the desired torque;

intersection estimation means for estimating an intersection time at which a value of the large-amplitude command current intersects a value of the required current; and forcing means for, if at the intersecting time, the change in operation state of the switching devices by the instantaneous current value control means has not taken place yet, forcibly changing the operation state of the switching devices.

3. The rotating machinery controller according to claim 2, further comprising: inhibiting means for inhibiting the change in operation state of the switching devices by the instantaneous current value control means from occurring for a predetermined period of time after the forced changing by the forcing means has taken place.

4. The rotating machinery controller according to claim 3, wherein the intersection estimation means comprises:

current value estimation means for estimating a value of the large-amplitude command current and a value of the required current at the next control time of the instantaneous current value control means;

determination means for, on the basis of a change in magnitude relation of the large-amplitude command current and the required current as occurring between values at the current control time and the estimated values at the next control time, determining whether the intersection time occurs before the next control time; and necessary time calculation means for, when the determination by the determination means shows that the intersection time occurs before the next control time, for calculating a necessary time that elapses before the next control time.

5. The rotating machinery controller according to claim 4, wherein the forcing means forcibly changes the operation state of the switching devices on condition that the magnitude relation of the large-amplitude command current and the required current differs from one another as for values taken at the preceding control time and the values at the current control time, and the operation state of the switching devices has not been changed throughout a period between the preceding control time and the current control time.

6. The rotating machinery controller according to claim 4, further comprising:

means for, with respect to each of the large-amplitude command current and the required current, setting values in a static coordinate system; and conversion means for converting the values in the static coordinate system into values in a rotational coordinate system, wherein the current value estimation means comprises:

means for performing a temporal differentiation of the large-amplitude command current and the required current based on output signals from the conversion means with the values in the static coordinate system being input signals to the conversion means; and means for, on the basis of the result of the temporal differentiation, calculating the large-amplitude command current and the required current at the next control time using Taylor's series of predetermined degree.

7. The rotating machinery controller according to claim 6, wherein the predetermined degree of the Taylor's series is a first degree or a second degree.

8. The rotating machinery controller according to claim 4, further comprising:

means for, with respect to each of the large-amplitude command current and the required current, setting values in a static coordinate system; and conversion means for converting the values in the static coordinate system into values in a rotational coordinate system, wherein the current value estimation means comprises means for calculating the product of a time period between the adjacent control times multiplied by a current electric angular velocity of the rotating machinery, and wherein the current value estimation means estimates the large-amplitude command current and the required current at the next control time through conversion performed by the conversion means with respect to values set in the static coordinate systems for each of the large-amplitude command and the required current at the current control time while using an electric angle which is leading the current electrical angle by the product calculated by said calculating means.

9. The rotating machinery controller according to claim 4, wherein the rectangular wave control means comprises:

timer means for measuring a time elapsed after the calculation of the necessary time by the necessary time calculating means; and means for performing the switching when a time measured by the timer means and the necessary time are in agreement.

10. The rotating machinery controller according to claim 9, wherein the amplitude of the large-amplitude command current is set to be greater than or equal to $Ad/(\omega min \times Tc)$ where Tc is the timing period of the timer means, Ad is the minimum unit quantity of the large-amplitude command current, and $\omega min$ is the minimum electrical angular velocity of the rotating machinery when the large-amplitude command current is used.

11. The rotating machinery controller according to claim 4, wherein the necessary time is calculated as the quotient of the difference between the large-amplitude command current and the necessary current divided by the difference between a temporal derivative value of the large-amplitude command current and a temporal derivative value of the required current.

12. The rotating machinery controller according to claim 2, wherein the amplitude of the large-amplitude command current is less than or equal to a value which is obtained as the product of a maximum rated current of the inverter multiplied by the square root of 2.

13. The rotating machinery controller according to claim 2, wherein the intersection time at which the large-amplitude command current intersects the required current is coincident with a switching time at which the operation state of the switching devices is changed from one state to the other so as to realize the desired torque through operation of the switching devices to cause the on-state and the off-state occur once for one cycle period in electrical angle of the rotating machinery.

14. The rotating machinery controller according to claim 2, wherein the phase T2 of the large-amplitude command current is set to satisfy the equation given below:

$$T2=T3-\arcsin\{(A1/A2)\times\sin(T3-T1)\}$$

where A1 is the amplitude of the required current, A2 is the amplitude of the large-amplitude command current, T1 is the phase of the desired torque, and T3 is the switching phase in which the operating state of the switching devices is changed from the on-state to the off-state and vice versa to realize the desired torque through operation of the switching devices to cause the on-state and the off-state to occur once for one cycle period in electrical angle of the rotating machinery.

15. The rotating machinery controller according to claim 1, wherein the instantaneous current value control means operates the switching devices based on the magnitude relation between the upper and lower limits of the hysteresis region determined by the command current and the actual current of the rotating machinery, so as to feedback-control the actual current of the rotating machinery toward a current required to generate the desired torque, and wherein the rotating machinery controller further comprises:

setting means for setting the command current to be a large-amplitude command current which is the same in period as, and larger in amplitude than, the required current;

intersection estimation means for estimating an intersection time at which the large-amplitude command current intersects the required current; and forcing means for, if at the intersection time, the operation state of the switching devices has not been changed by the instantaneous current value control means, forcibly changing the operation state of the switching devices.

16. The rotating machinery controller according to claim 1, wherein the instantaneous current value control means includes output means for, with a current required to generate the desired torque being set to be the command current, outputting a distinct logic value each time when the actual current is larger than the upper limit of the hysteresis region, when the actual current is contained within the hysteresis region, and when the actual current is smaller than the lower limit of the hysteresis region, and wherein the switching means conduct the switching based on the logic value output from the output means.

17. The rotating machinery controller according to claim 16, wherein the hysteresis region is variably set according to the desired torque and a rotational speed of the rotating machinery.

18. The rotating machinery controller according to claim 16, wherein the hysteresis region is set to contain the actual current which appears when the difference between the command current and the actual current reaches a maximum value while the rectangular wave control is normally performed.

19. The rotating machinery controller according to claim 16, wherein the rectangular wave control means comprises:

intersection estimation means for estimating an intersection time at which a large-amplitude command current which is the same in period as, and larger in amplitude than, the required current intersects the required current; and means for conducting the change in operation state of the switching devices at the intersection time estimated by the intersection estimation means.

20. The rotating machinery controller according to claim 19, wherein the intersection estimation means comprises:

current value estimation means for estimating a value of the large-amplitude command current and a value of the required current at the next control time of the rectangular wave control means;

determination means for, on the basis of a change in magnitude relation of the large-amplitude command current and the required current as occurring between values at the current control time and the estimated values at the next control time, determining whether the intersection time occurs before the next control time; and necessary time calculation means for, when the determination by the determination means shows that the intersection time occurs before the next control time, for calculating a necessary time that elapses before the next control time.

21. The rotating machinery controller according to claim 1, wherein the control by the rectangular wave controller is performed when at least one of a rotational speed and an output torque of the rotating machinery is greater than or equal to a predetermined value.

22. A rotating machinery controller for controlling a rotation-related physical quantity of a rotating machinery by operating switching devices of an inverter to supply electric power to the rotating machinery, the rotating machinery controller comprising:

rectangular wave control means for controlling an output torque of the rotating machinery toward a desired torque by operating the switching devices such that an on-state and an off-state occur one time for one cycle period in electrical angle of the rotating machinery;

instantaneous current value control means for, in order to control an actual current of the rotating machinery within a predetermined hysteresis region which is determined by a command current to the rotating machinery, operating the switching devices on the basis of a magnitude relation between upper and lower limits of the hysteresis region and the actual current, wherein the instantaneous current value control means operates the switching devices based on the magnitude relation between the upper and lower limits of the hysteresis region determined by the command current and the actual current of the rotating machinery, so as to feedback-control the actual current of the rotating machinery toward a current required to generate the desired torque;

switching means for, when a current flowing through the rotating machinery deviates from the hysteresis region while the control by the rectangular wave control means is undertaken, switching the control by the rectangular wave control means to the control by the instantaneous current value control means;

setting means for setting the command current to be a large-amplitude command current which is the same in period as, and larger in amplitude than, the required current;

intersection estimation means for estimating an intersection time at which the large-amplitude command current intersects the required current;

forcing means for, if at the intersection time, the operation state of the switching devices has not been changed by the instantaneous current value control means, forcibly changing the operation state of the switching devices and inhibiting means for inhibiting the change in operation state of the switching devices by the instantaneous current value control means from occurring for a predetermined period of time after the forced changing by the forcing means has taken place.

* * * * *